US008798554B2

(12) United States Patent
Darnell et al.

(10) Patent No.: US 8,798,554 B2
(45) Date of Patent: Aug. 5, 2014

(54) TUNABLE ANTENNA SYSTEM WITH MULTIPLE FEEDS

(75) Inventors: Dean F. Darnell, San Jose, CA (US); Yuehui Ouyang, Cupertino, CA (US); Hao Xu, Cupertino, CA (US); Enrique Ayala Vazquez, Watsonville, CA (US); Yijun Zhou, Sunnyvale, CA (US); Peter Bevelacqua, Cupertino, CA (US); Joshua G. Nickel, San Jose, CA (US); Nanbo Jin, Sunnyvale, CA (US); Matthew A. Mow, Los Altos, CA (US); Robert W. Schlub, Cupertino, CA (US); Mattia Pascolini, Campbell, CA (US); Hongfei Hu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 205 days.

(21) Appl. No.: 13/368,855

(22) Filed: Feb. 8, 2012

(65) Prior Publication Data

US 2013/0203364 A1 Aug. 8, 2013

(51) Int. Cl.
*H04B 1/40* (2006.01)

(52) U.S. Cl.
USPC .............. 455/77; 455/73; 455/90.3; 343/702; 343/745; 333/132

(58) Field of Classification Search
USPC .............. 455/73, 77, 90.3, 132, 550.1, 575.7; 343/702, 745, 850, 853, 857, 909; 333/132
See application file for complete search history.

(56) References Cited

U.S. PATENT DOCUMENTS

| | | | |
|---|---|---|---|
| 4,518,965 | A | 5/1985 | Hidaka |
| 5,048,118 | A | 9/1991 | Brooks et al. |
| 5,768,691 | A | 6/1998 | Kangas et al. |
| 6,218,997 | B1 | 4/2001 | Lindenmeier et al. |
| 6,560,443 | B1 | 5/2003 | Vaisanen et al. |
| 6,670,923 | B1 | 12/2003 | Kadambi et al. |
| 6,980,154 | B2 | 12/2005 | Vance et al. |
| 7,043,285 | B2 | 5/2006 | Boyle |
| 7,164,387 | B2 | 1/2007 | Sievenpiper |
| 7,215,283 | B2 | 5/2007 | Boyle |
| 7,250,910 | B2 | 7/2007 | Yoshikawa et al. |

(Continued)

FOREIGN PATENT DOCUMENTS

| | | |
|---|---|---|
| EP | 1363360 | 11/2003 |
| EP | 2328233 | 1/2011 |

(Continued)

*Primary Examiner* — Tuan H Nguyen
(74) *Attorney, Agent, or Firm* — Treyz Law Group; G. Victor Treyz; Michael H. Lyons

(57) ABSTRACT

Electronic devices may be provided that contain wireless communications circuitry. The wireless communications circuitry may include radio-frequency transceiver circuitry and antenna structures. The antenna structures may form an antenna having first and second feeds at different locations. The transceiver circuit may have a first circuit that handles communications using the first feed and may have a second circuit that handles communications using the second feed. A first filter may be interposed between the first feed and the first circuit and a second filter may be interposed between the second feed and the second circuit. The first and second filters and the antenna may be configured so that the first circuit can use the first feed without being adversely affected by the presence of the second feed and so that the second circuit can use the second feed without being adversely affected by the presence of the first feed.

26 Claims, 22 Drawing Sheets

(56) References Cited

U.S. PATENT DOCUMENTS

| | | | |
|---|---|---|---|
| 7,260,424 | B2 | 8/2007 | Schmidt |
| 7,439,911 | B2 | 10/2008 | Wang |
| 7,595,759 | B2 | 9/2009 | Schlub et al. |
| 7,612,725 | B2 | 11/2009 | Hill et al. |
| 7,626,551 | B2 | 12/2009 | Chien et al. |
| 7,671,804 | B2 | 3/2010 | Zhang et al. |
| 7,808,438 | B2 | 10/2010 | Schlub et al. |
| 7,843,396 | B2 | 11/2010 | Hill et al. |
| 7,893,883 | B2 | 2/2011 | Schlub et al. |
| 7,898,485 | B2 | 3/2011 | Schlub et al. |
| 7,924,231 | B2 | 4/2011 | Hill et al. |
| 8,094,079 | B2 | 1/2012 | Schlub et al. |
| 8,270,914 | B2 | 9/2012 | Pascolini et al. |
| 2003/0122721 | A1 | 7/2003 | Sievenpiper |
| 2003/0222823 | A1 | 12/2003 | Flint et al. |
| 2004/0222926 | A1 | 11/2004 | Kontogeorgakis et al. |
| 2004/0227674 | A1 | 11/2004 | Asano et al. |
| 2004/0227678 | A1 | 11/2004 | Sievenpiper |
| 2004/0257283 | A1 | 12/2004 | Asano et al. |
| 2005/0007291 | A1 | 1/2005 | Fabrega-Sanchez et al. |
| 2005/0270242 | A1 | 12/2005 | Qi et al. |
| 2006/0055606 | A1 | 3/2006 | Boyle |
| 2006/0097918 | A1 | 5/2006 | Oshiyama |
| 2007/0222697 | A1 | 9/2007 | Caimi et al. |
| 2008/0165065 | A1 | 7/2008 | Hill et al. |
| 2008/0218291 | A1 | 9/2008 | Zhu et al. |
| 2008/0238794 | A1 | 10/2008 | Pan et al. |
| 2009/0128428 | A1 | 5/2009 | Ishizuka et al. |
| 2009/0180403 | A1 | 7/2009 | Tudosoiu |
| 2009/0231215 | A1 | 9/2009 | Taura |
| 2010/0053002 | A1 | 3/2010 | Wojack et al. |
| 2010/0085260 | A1 | 4/2010 | McKinzie et al. |
| 2010/0238079 | A1 | 9/2010 | Ayatollahi et al. |
| 2010/0253538 | A1 | 10/2010 | Smith |
| 2010/0279734 | A1 | 11/2010 | Karkinen et al. |
| 2010/0295737 | A1 | 11/2010 | Milosavljevic et al. |
| 2011/0021139 | A1 | 1/2011 | Montgomery et al. |
| 2011/0133995 | A1 | 6/2011 | Pascolini et al. |
| 2011/0183721 | A1 | 7/2011 | Hill et al. |
| 2011/0193754 | A1 | 8/2011 | Schlub et al. |
| 2011/0241949 | A1 | 10/2011 | Nickel et al. |
| 2012/0009983 | A1 | 1/2012 | Mow et al. |
| 2012/0046002 | A1 | 2/2012 | Hill et al. |
| 2012/0112969 | A1 | 5/2012 | Caballero et al. |
| 2012/0112970 | A1 | 5/2012 | Caballero et al. |
| 2012/0229347 | A1 | 9/2012 | Jin et al. |
| 2012/0231750 | A1 | 9/2012 | Jin et al. |
| 2012/0299785 | A1 | 11/2012 | Bevelacqua |
| 2013/0102357 | A1 * | 4/2013 | Vance ........................ 455/550.1 |

FOREIGN PATENT DOCUMENTS

| | | |
|---|---|---|
| EP | 2405534 | 1/2012 |
| JP | 09093029 | 4/1997 |
| JP | 2000332530 | 11/2000 |
| JP | 2005159813 | 6/2005 |
| JP | 2005167730 | 6/2005 |
| WO | 0199230 | 12/2001 |
| WO | 02054534 | 7/2002 |
| WO | 2006114771 | 11/2006 |
| WO | 2007012697 | 2/2007 |
| WO | 2011050845 | 5/2011 |
| WO | 2011158057 | 12/2011 |

* cited by examiner

TUNABLE ANTENNA SYSTEM WITH MULTIPLE FEEDS

BACKGROUND

This relates generally to electronic devices, and more particularly, to antennas for electronic devices with wireless communications circuitry.

Electronic devices such as portable computers and cellular telephones are often provided with wireless communications capabilities. For example, electronic devices may use long-range wireless communications circuitry such as cellular telephone circuitry to communicate using cellular telephone bands. Electronic devices may use short-range wireless communications circuitry such as wireless local area network communications circuitry to handle communications with nearby equipment. Electronic devices may also be provided with satellite navigation system receivers and other wireless circuitry.

To satisfy consumer demand for small form factor wireless devices, manufacturers are continually striving to implement wireless communications circuitry such as antenna components using compact structures. At the same time, it may be desirable to include conductive structures in an electronic device such as metal device housing components. Because conductive components can affect radio-frequency performance, care must be taken when incorporating antennas into an electronic device that includes conductive structures. Moreover, care must be taken to ensure that the antennas and wireless circuitry in a device are able to exhibit satisfactory performance over a range of operating frequencies.

It would therefore be desirable to be able to provide improved wireless communications circuitry for wireless electronic devices.

SUMMARY

Electronic devices may be provided that contain wireless communications circuitry. The wireless communications circuitry may include radio-frequency transceiver circuitry and antenna structures. The antenna structures may form an antenna having first and second feeds at different locations. The transceiver circuit may have a first circuit that handles communications using the first feed and may have a second circuit that handles communications using the second feed.

A first filter may be interposed between the first feed and the first circuit and a second filter may be interposed between the second feed and the second circuit. The first and second filters and the antenna may be configured so that the first circuit can use the first feed without being adversely affected by the presence of the second feed and so that the second circuit can use the second feed without being adversely affected by the presence of the first feed. For example, the first filter may be configured to pass signals in a frequency band of interest to the first circuit while exhibiting an impedance that ensures satisfactory antenna performance in frequency bands of interest to the second circuit. The second filter may likewise be configured to pass signals in a frequency band of interest to the second circuit while exhibiting an impedance that ensures satisfactory antenna performance in frequency bands of interest to the first circuit.

The first circuit may be coupled to the first feed using a first signal path. The second circuit may be coupled to the second feed using a second signal path. One or more impedance matching circuits may be interposed within the first and second signal paths. For example, a tunable impedance matching circuit may be interposed within the second signal path. The tunable impedance matching circuit may be tuned to provide antenna coverage over a desired range of frequencies.

Further features of the invention, its nature and various advantages will be more apparent from the accompanying drawings and the following detailed description of the preferred embodiments.

DETAILED DESCRIPTION

Figure 1:
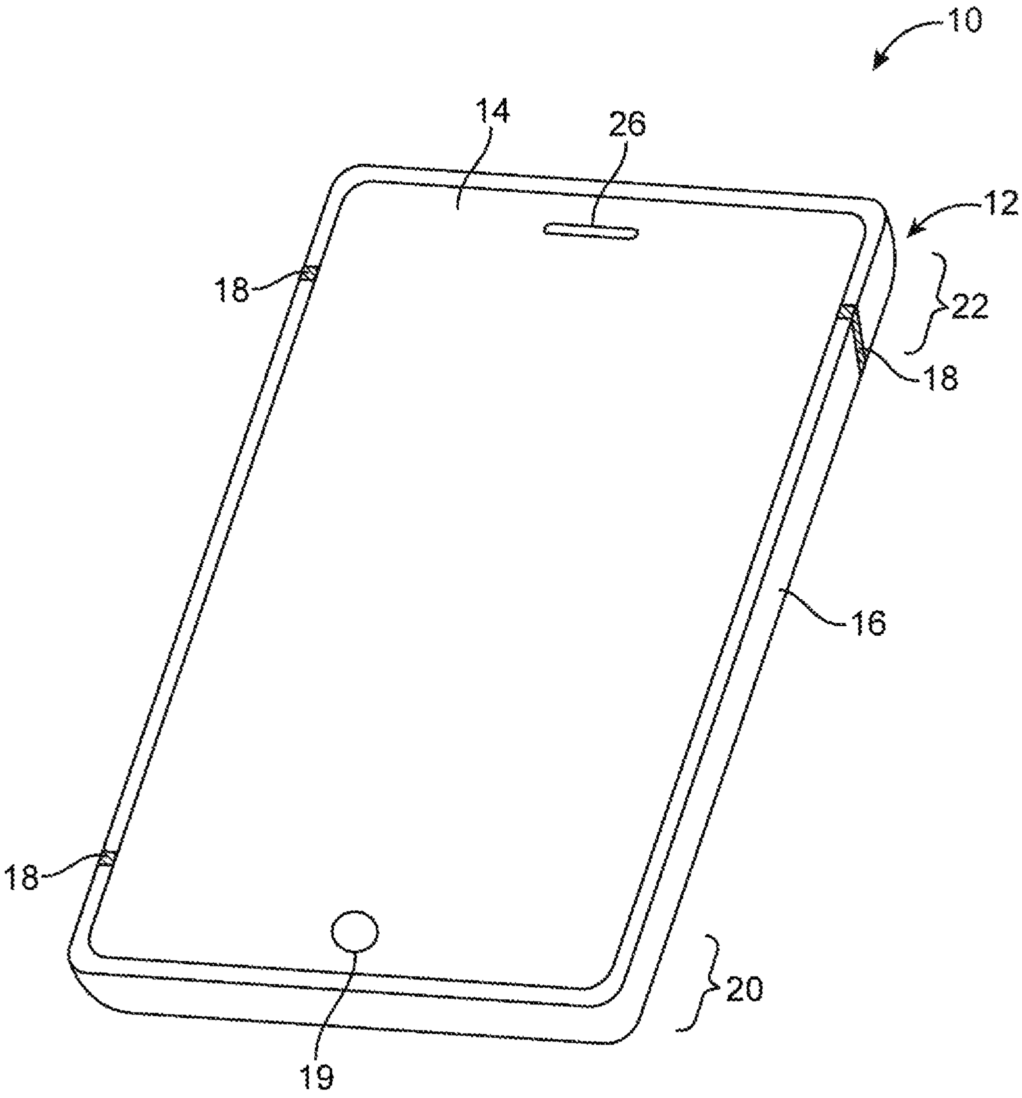
FIG. 1 is a perspective view of an illustrative electronic device with wireless communications circuitry in accordance with an embodiment of the present invention.

Electronic devices such as electronic device 10 of FIG. 1 may be provided with wireless communications circuitry. The wireless communications circuitry may be used to support wireless communications in multiple wireless communications bands. The wireless communications circuitry may include one or more antennas.

The antennas can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures. The conductive electronic device structures may include conductive housing structures. The housing structures may include a peripheral conductive member that runs around the periphery of an electronic device. The peripheral conductive member may serve as a bezel for a planar structure such as a display, may serve as sidewall structures for a device housing, and/or may form other housing structures. Gaps in the peripheral conductive member may be associated with the antennas.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, or a media player. Device 10 may also be a television, a set-top box, a desktop computer, a computer monitor into which a computer has been integrated, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electrowetting pixels, electrophoretic pixels, liquid crystal display (LCD) components, or other suitable image pixel structures. A cover glass layer may cover the surface of display 14. Buttons such as button 19 may pass through openings in the cover glass. The cover glass may also have other openings such as an opening for speaker port 26.

Housing 12 may include a peripheral member such as member 16. Member 16 may run around the periphery of device 10 and display 14. In configurations in which device 10 and display 14 have a rectangular shape, member 16 may have a rectangular ring shape (as an example). Member 16 or part of member 16 may serve as a bezel for display 14 (e.g., a cosmetic trim that surrounds all four sides of display 14 and/or helps hold display 14 to device 10). Member 16 may also, if desired, form sidewall structures for device 10 (e.g., by forming a metal band with vertical sidewalls, etc.).

Member 16 may be formed of a conductive material and may therefore sometimes be referred to as a peripheral conductive member or conductive housing structures. Member 16 may be formed from a metal such as stainless steel, aluminum, or other suitable materials. One, two, or more than two separate structures may be used in forming member 16.

It is not necessary for member 16 to have a uniform cross-section. For example, the top portion of member 16 may, if desired, have an inwardly protruding lip that helps hold display 14 in place. If desired, the bottom portion of member 16 may also have an enlarged lip (e.g., in the plane of the rear surface of device 10). In the example of FIG. 1, member 16 has substantially straight vertical sidewalls. This is merely illustrative. The sidewalls of member 16 may be curved or may have any other suitable shape. In some configurations (e.g., when member 16 serves as a bezel for display 14), member 16 may run around the lip of housing 12 (i.e., member 16 may cover only the edge of housing 12 that surrounds display 14 and not the rear edge of housing 12 of the sidewalls of housing 12).

Display 14 may include conductive structures such as an array of capacitive electrodes, conductive lines for addressing pixel elements, driver circuits, etc. Housing 12 may include internal structures such as metal frame members, a planar housing member (sometimes referred to as a midplate) that spans the walls of housing 12 (i.e., a substantially rectangular member that is welded or otherwise connected between opposing sides of member 16), printed circuit boards, and other internal conductive structures. These conductive structures may be located in the center of housing 12 under display 14 (as an example).

In regions 22 and 20, openings may be formed within the conductive structures of device 10 (e.g., between peripheral conductive member 16 and opposing conductive structures such as conductive housing structures, a conductive ground plane associated with a printed circuit board, and conductive electrical components in device 10). These openings may be filled with air, plastic, and other dielectrics. Conductive housing structures and other conductive structures in device 10 may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, or may otherwise serve as part of antenna structures formed in regions 20 and 22.

In general, device 10 may include any suitable number of antennas (e.g., one or more, two or more, three or more, four or more, etc.). The antennas in device 10 may be located at opposing first and second ends of an elongated device housing, along one or more edges of a device housing, in the center of a device housing, in other suitable locations, or in one or more of such locations. The arrangement of FIG. 1 is merely illustrative.

Portions of member 16 may be provided with gap structures. For example, member 16 may be provided with one or more gaps such as gaps 18, as shown in FIG. 1. The gaps may be filled with dielectric such as polymer, ceramic, glass, air, other dielectric materials, or combinations of these materials. Gaps 18 may divide member 16 into one or more peripheral conductive member segments. There may be, for example, two segments of member 16 (e.g., in an arrangement with two gaps), three segments of member 16 (e.g., in an arrangement with three gaps), four segments of member 16 (e.g., in an arrangement with four gaps, etc.). The segments of peripheral conductive member 16 that are formed in this way may form parts of antennas in device 10.

In a typical scenario, device 10 may have upper and lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Figure 2:
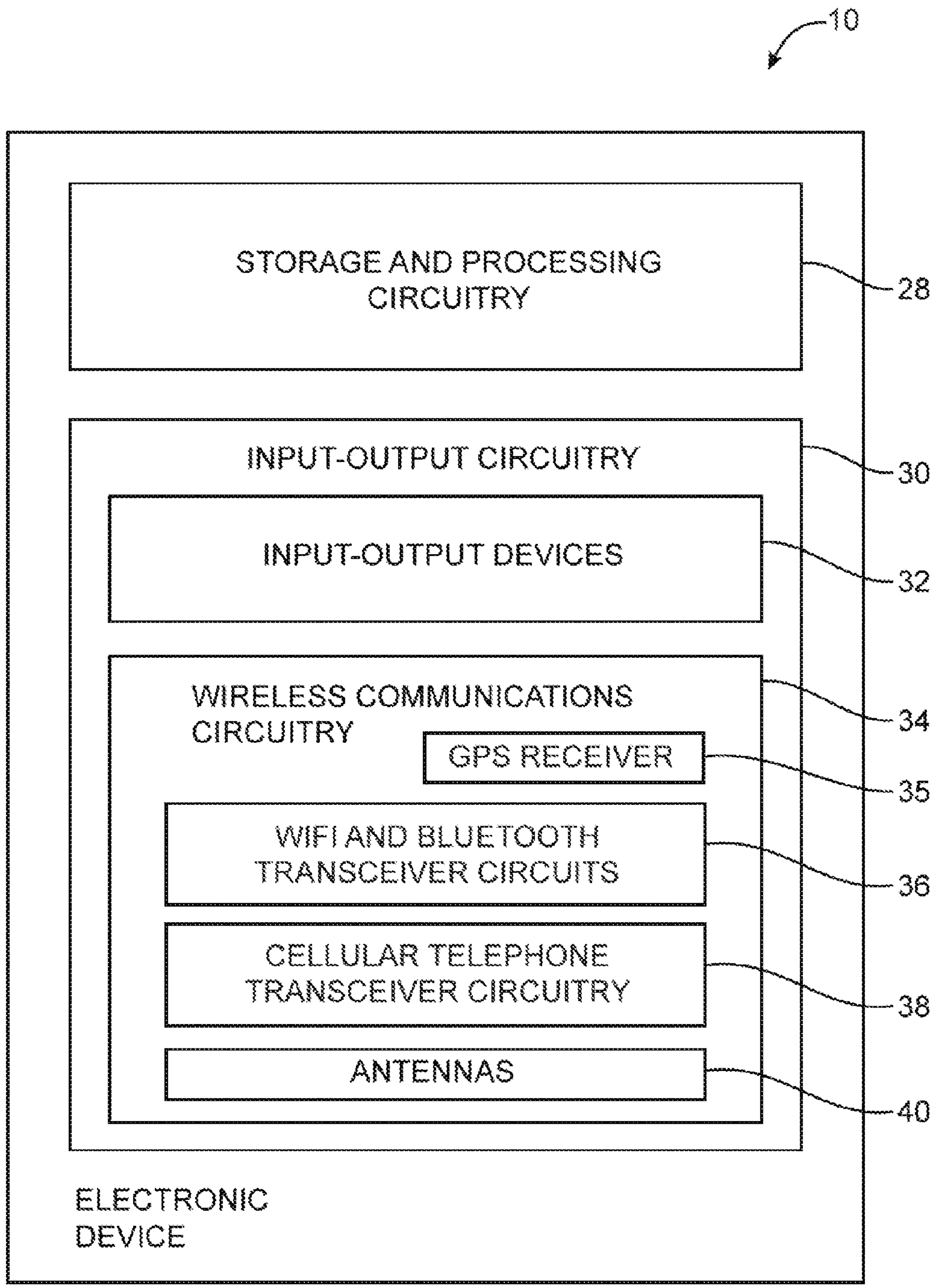
FIG. 2 is a schematic diagram of an illustrative electronic device with wireless communications circuitry in accordance with an embodiment of the present invention.

A schematic diagram of an illustrative configuration that may be used for electronic device 10 is shown in FIG. 2. As shown in FIG. 2, electronic device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. The processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, etc.

Circuitry 28 may be configured to implement control algorithms that control the use of antennas in device 10. For example, circuitry 28 may perform signal quality monitoring operations, sensor monitoring operations, and other data gathering operations and may, in response to the gathered data and information on which communications bands are to be used in device 10, control which antenna structures within device 10 are being used to receive and process data and/or may adjust one or more switches, tunable elements, or other adjustable circuits in device 10 to adjust antenna performance. As an example, circuitry 28 may control which of two or more antennas is being used to receive incoming radio-frequency signals, may control which of two or more antennas is being used to transmit radio-frequency signals, may control the process of routing incoming data streams over two or more antennas in device 10 in parallel, may tune an antenna to cover a desired communications band, etc. In performing these control operations, circuitry 28 may open and close switches, may turn on and off receivers and transmitters, may adjust impedance matching circuits, may configure switches in front-end-module (FEM) radio-frequency circuits that are interposed between radio-frequency transceiver circuitry and antenna structures (e.g., filtering and switching circuits used for impedance matching and signal routing), may adjust switches, tunable circuits, and other adjustable circuit elements that are formed as part of an antenna or that are coupled to an antenna or a signal path associated with an antenna, and may otherwise control and adjust the components of device 10.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Wireless communications circuitry 34 may include satellite navigation system receiver circuitry such as Global Positioning System (GPS) receiver circuitry 35 (e.g., for receiving satellite positioning signals at 1575 MHz) or satellite navigation system receiver circuitry associated with other satellite navigation systems. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as bands in frequency ranges of about 700 MHz to about 2200 MHz or bands at higher or lower frequencies. Wireless communications circuitry 34 can include circuitry for other short-range and long-range wireless links if desired. For example, wireless communications circuitry 34 may include wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include one or more antennas 40. Antennas 40 may be formed using any suitable antenna types. For example, antennas 40 may include antennas with resonating elements that are formed from loop antenna structure, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link.

If desired, one or more of antennas 40 may be provided with multiple antenna feeds and/or adjustable components. Antennas such as these may be used to cover desired communications bands of interest. For example, a first antenna feed may be associated with a first set of communications frequencies and a second antenna feed may be associated with a second set of communications frequencies. The use of multiple feeds (and/or adjustable antenna components) may make it possible to reduce antenna size (volume) within device 10 while satisfactorily covering desired communications bands.

Figure 3:
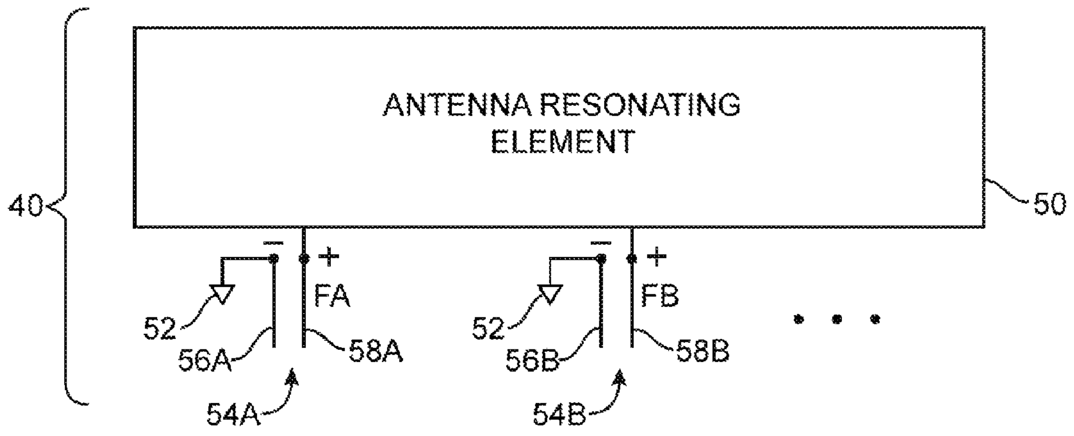
FIG. 3 is a diagram of an illustrative antenna having multiple feeds in accordance with an embodiment of the present invention.

An illustrative configuration for an antenna with multiple feeds of the type that may be used in implementing one or more antennas for device 10 is shown in FIG. 3. As shown in FIG. 3, antenna 40 may have conductive antenna structures such as antenna resonating element 50 and antenna ground 52. The conductive structures that form antenna resonating element 50 and antenna ground 52 may be formed from parts of conductive housing structures, from parts of electrical device components in device 10, from printed circuit board traces, from strips of conductor such as strips of wire and metal foil, or other conductive materials.

Each antenna feed associated with antenna 40 may, if desired, have a distinct location. As shown in FIG. 3, antenna 40 may have a first feed such as feed FA at a first location in antenna 40, a second feed such as feed FB at a second location in antenna 40, and one or more additional antenna feeds at potentially different respective locations of antenna 40.

Each feed may be coupled to an associated set of conductive signal paths using terminals such as positive antenna feed terminals (+) and ground antenna feed terminals (−). For example, path 54A may have a positive conductor 58A that is coupled to a positive antenna feed terminal in feed FA and a ground conductor 56A that is coupled to a ground antenna feed terminal in feed FA, whereas path 54B may have a positive conductor 58B that is coupled to a positive antenna feed terminal in feed FB and a ground conductor 56B that is coupled to a ground antenna feed terminal in feed FB. Paths such as paths 54A and 54B may be implemented using transmission line structures such as coaxial cables, microstrip transmission lines (e.g., microstrip transmission lines on printed circuits), stripline transmission lines (e.g., stripline transmission lines on printed circuits), or other transmission lines or signal paths. Circuits such as impedance matching and filter circuits and other circuitry may be interposed within paths 54A and 54B.

The conductive structures that form antenna resonating element 50 and antenna ground 52 may be used to form any suitable type of antenna.

Figure 4:
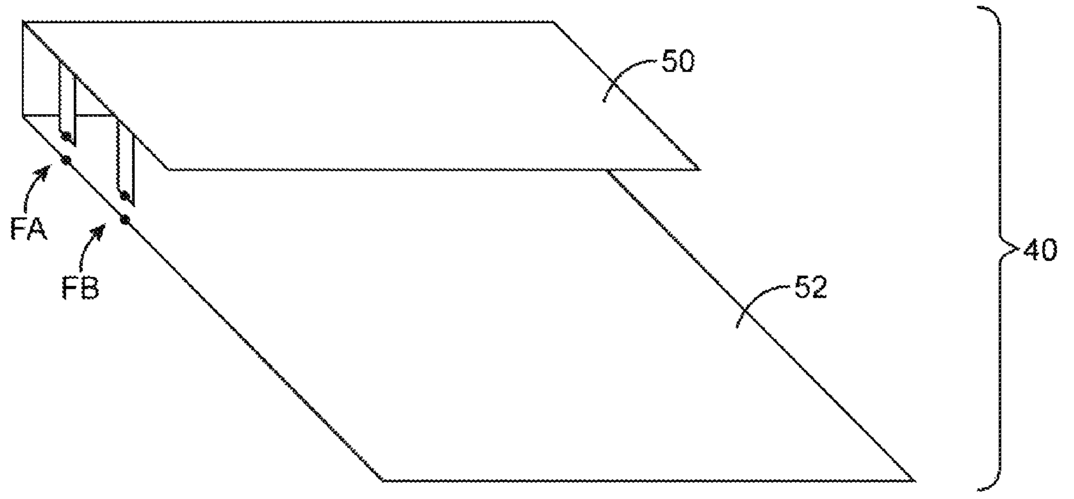
FIG. 4 is a diagram of an illustrative planar inverted-F antenna with multiple feeds in accordance with an embodiment of the present invention.

In the example of FIG. 4, antenna 40 has been implemented using a planar inverted-F configuration having a first antenna feed (feed FA) and a second antenna feed (feed FB).

Figure 5:
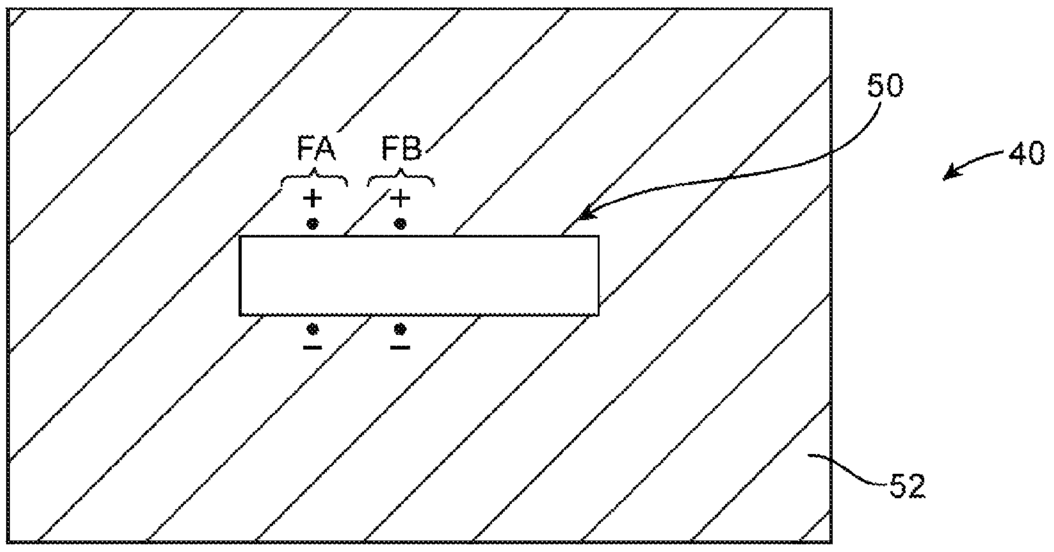
FIG. 5 is a diagram of an illustrative slot antenna with multiple feeds in accordance with an embodiment of the present invention.

FIG. 5 is a top view of an illustrative slot antenna configuration that may be used for antenna 40. In the FIG. 5 example, antenna resonating element 50 is formed from a closed (enclosed) rectangular slot (e.g., a dielectric-filled opening) in ground plane 52. Feeds FA and FB may each have a respective pair of antenna feed terminals (+/−) located at a respective position along the antenna slot.

Figure 6:
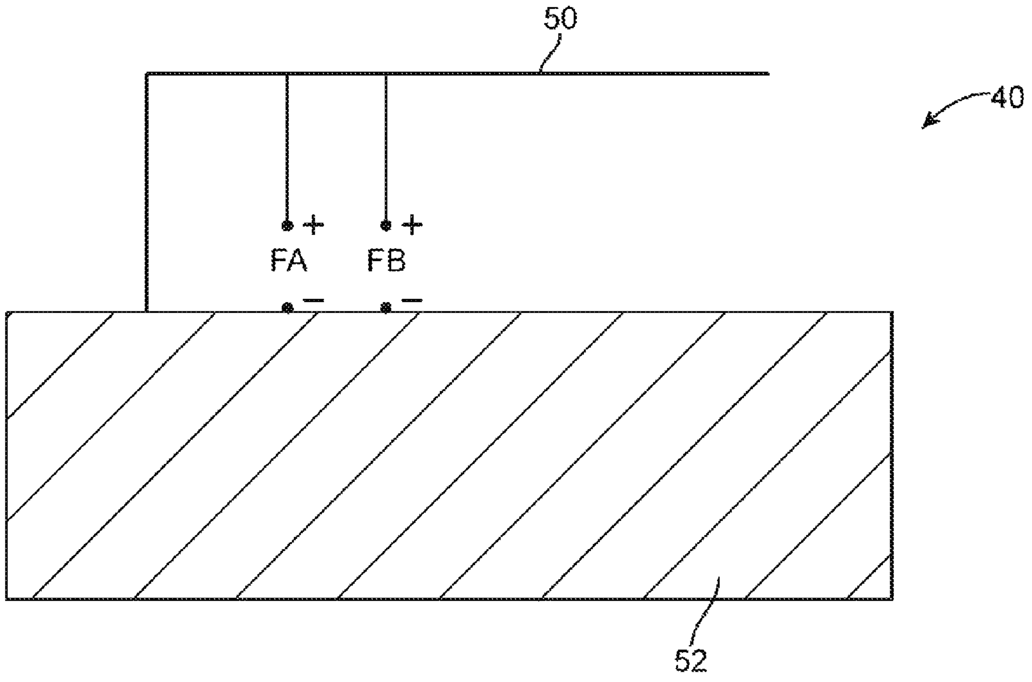
FIG. 6 is a diagram of an illustrative inverted-F antenna with multiple feeds in accordance with an embodiment of the present invention.

In the illustrative configuration of FIG. 6, antenna 40 has been implemented using an inverted-F antenna design. Inverted-F antenna 40 of FIG. 6 has a first antenna feed (feed FA with a corresponding positive terminal and ground terminal) and has a second antenna feed (feed FB with a corresponding positive terminal and ground terminal). Feeds FA and FB may be located at different respective locations along the length of the main resonating element arm that forms inverted-F antenna 40. Inverted-F configurations with multiple arms or arms of different shapes may be used, if desired.

Figure 7:
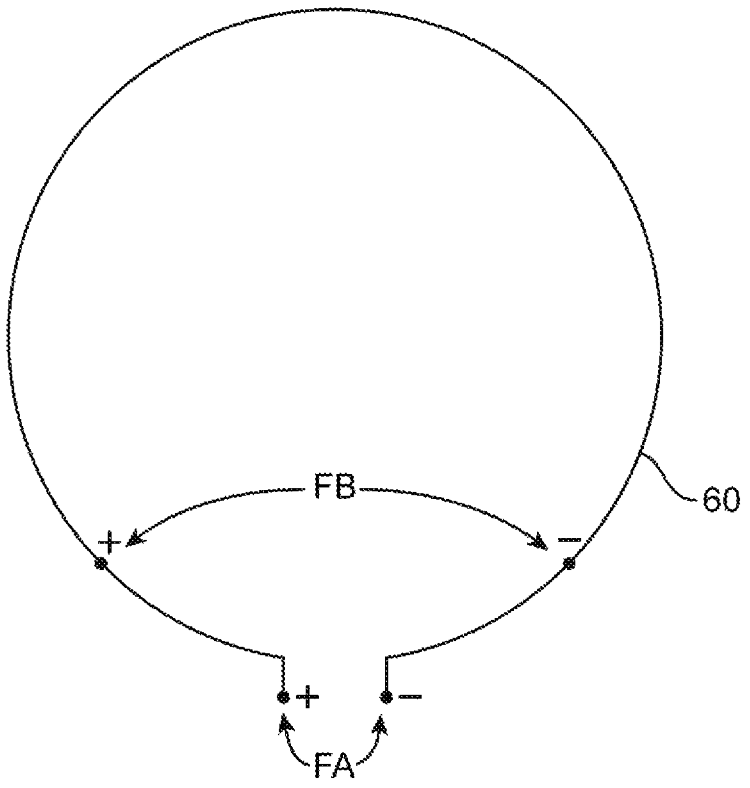
FIG. 7 is a diagram of an illustrative loop antenna with multiple feeds in accordance with an embodiment of the present invention.

FIG. 7 is a diagram showing how antenna 40 may be implemented using a loop antenna configuration with multiple antenna feeds. As shown in FIG. 7, antenna 40 may have a loop of conductive material such as loop 60. Loop 60 may be formed from conductive structures 50 and/or conductive structures 52 (FIG. 3). A first antenna feed such as feed FA may have a positive antenna feed terminal (+) and a ground antenna feed terminal (−) and may be used to feed one portion of loop 60 and a second antenna feed such as feed FB may have a positive antenna feed terminal (+) and a ground antenna feed terminal (−) and may be used to feed antenna 40 at a different portion of loop 60.

The illustrative examples of FIGS. 4, 5, 6, and 7 are merely illustrative. Antenna 40 may, in general, have any suitable number of antenna feeds and may be formed using any suitable type of antenna structures.

Figure 8:
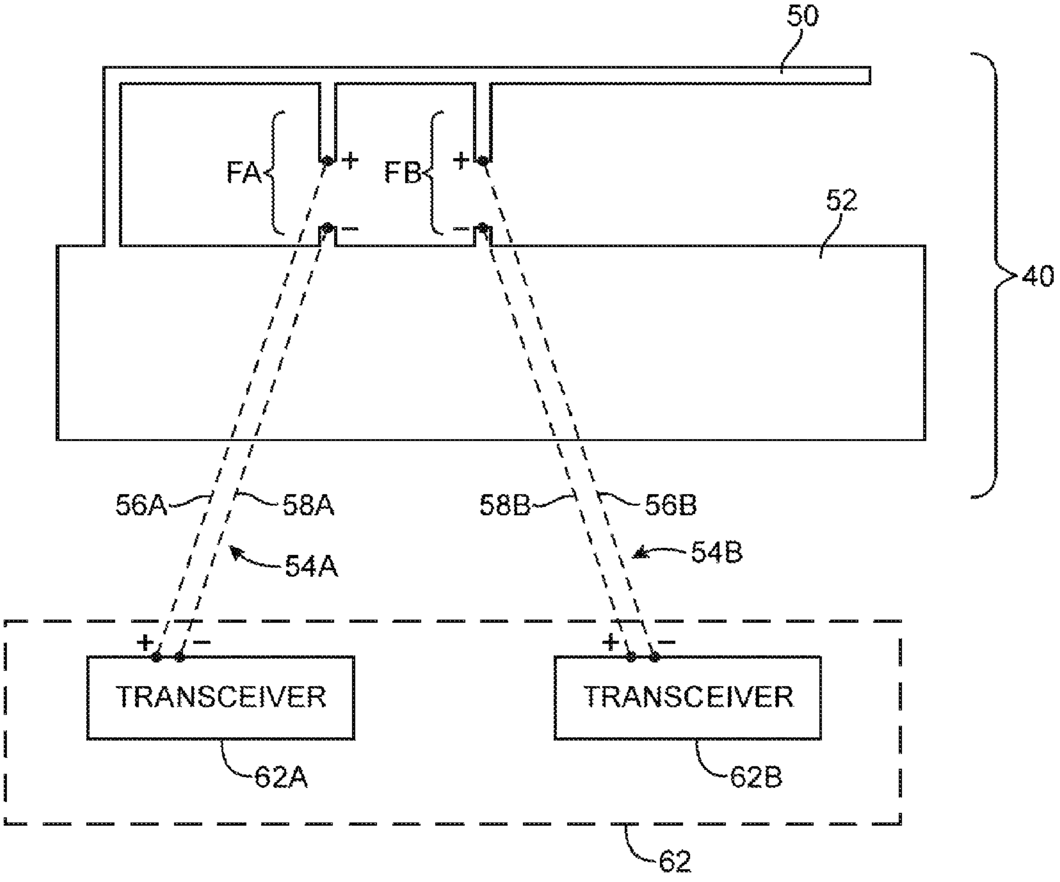
FIG. 8 is a diagram of an inverted-F antenna with multiple feeds showing how radio-frequency transceiver circuitry may be coupled to the feeds using transmission lines in accordance with an embodiment of the present invention.

FIG. 8 shows how antenna 40 may be coupled to transceiver circuitry 62. Antenna 40 of FIG. 8 is an inverted-F antenna, but, in general, any suitable type of antenna may be used in implementing antenna 40. Antenna 40 may have multiple feeds such as illustrative first antenna feed FA with a positive antenna feed terminal (+) and a ground antenna feed terminal (−) and illustrative second antenna feed FB with a positive antenna feed terminal (+) and ground antenna feed terminal (−). Path 54A may include one or more transmission line segments and may include positive conductor 56A and ground conductor 58A. Path 54B may include one or more transmission line segments and may include positive conductor 56B and ground conductor 58B. One or more circuits such as filter circuits and impedance matching circuits and other circuits (not shown in FIG. 8) may be interposed within paths 54A and 54B. Transceiver circuitry 62 may include radio-frequency receivers and/or radio-frequency transmitters such as transceivers 62A and 62B.

Path 54A may be coupled between a first radio-frequency transceiver circuit such as transceiver 62A and first antenna feed FA. Path 54B may be used to couple a second radio-frequency transceiver circuit such as transceiver 62A to second antenna feed FA. Feeds FA and FB may be used in transmitting and/or receiving radio-frequency antenna signals. Transceiver 62A may include a radio-frequency receiver and/or a radio-frequency transmitter. Transceiver 62B may also include a radio-frequency receiver and/or a radio-frequency transmitter.

As an example, transceiver 62A may include a satellite navigation system receiver and transceiver 62B may include a cellular telephone transceiver (having a cellular telephone transmitter and a cellular telephone receiver). As another example, transceiver 62A may have a transmitter and/or a receiver that operate at frequencies associated with a first communications band (e.g., a first cellular or wireless local area network band) and transceiver 62*b* may have a transmitter and/or a receiver that operate at frequencies associated with a second communications band (e.g., a second cellular or wireless local area network band). Other types of configurations may be used, if desired. Transceivers 62A and 62B may be implemented using separate integrated circuits or may be integrated into a common integrated circuit (as examples). One or more associated additional integrated circuits (e.g., one or more baseband processor integrated circuits) may be used to provide transceiver circuitry 62 with data to be transmitted by antenna 40 and may be used to receive and process data that has been received by antenna 40.

Figure 9:
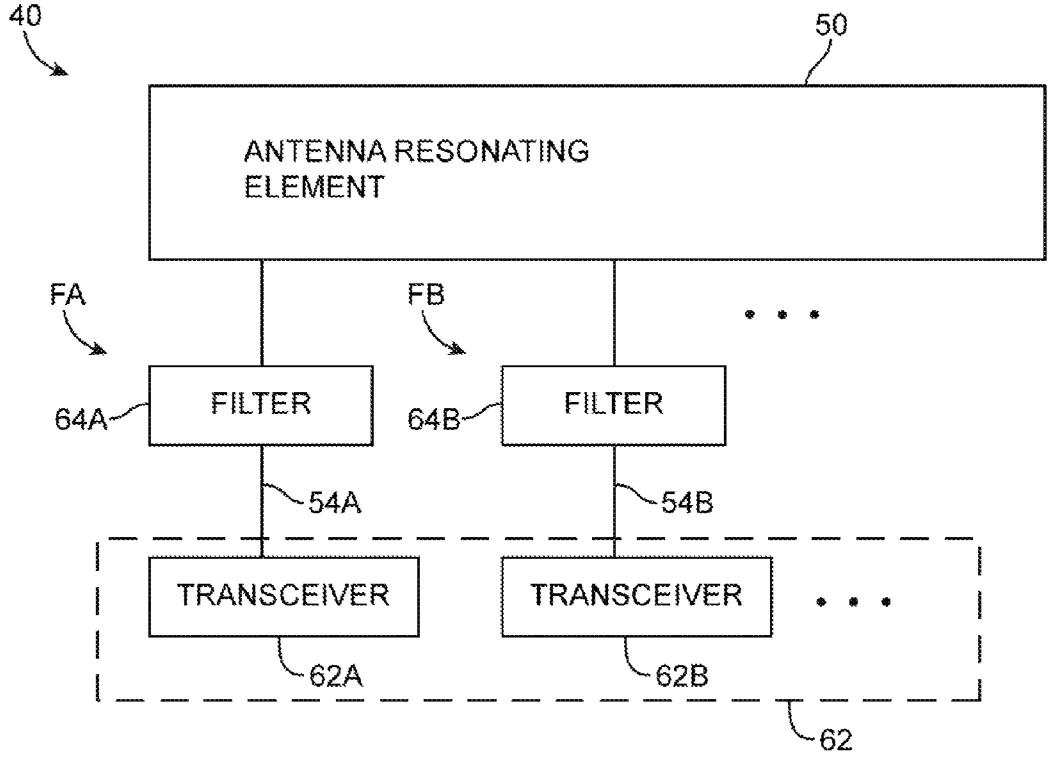
FIG. 9 is a diagram of an illustrative antenna with multiple feeds each of which has an associated radio-frequency filter circuit in accordance with an embodiment of the present invention.

Filter circuitry and impedance matching circuitry may be interposed in paths such as paths 54A and 54B. As shown in FIG. 9, for example, filter 64A may be interposed in path 54A between feed FA and transceiver 62A, so that signals that are transmitted and/or received using antenna feed FA are filtered by filter 64A. Filter 64B may likewise be interposed in path 54B, so that signals that are transmitted and/or received using antenna feed FB are filtered by filter 64B. Filters 64A and 64B may be adjustable or fixed. In fixed filter configurations, the transmittance of the filters as a function of signal frequency is fixed. In adjustable filter configurations, adjustable components may be placed in different states to adjust the transmittance characteristics of the filters. If desired, fixed and/or adjustable impedance matching circuits (e.g., circuitry for impedance matching a transmission line to antenna 40 or other wireless circuitry) may be included in paths 54A and 54B (e.g., as part of filters 64A and 64B or as separate circuits).

Filters 64A and 64B may be configured so that the antenna feeds in antenna 40 may operate satisfactorily, even in a configuration in which multiple feeds are coupled to antenna 40 simultaneously. The way in which filters 64A and 64B may be configured to support the simultaneous presence of multiple feeds is set forth in connection with FIGS. 10, 11, 12, 13, 14, 15, 16, 17, 18, 19, and 20.

Figure 10:
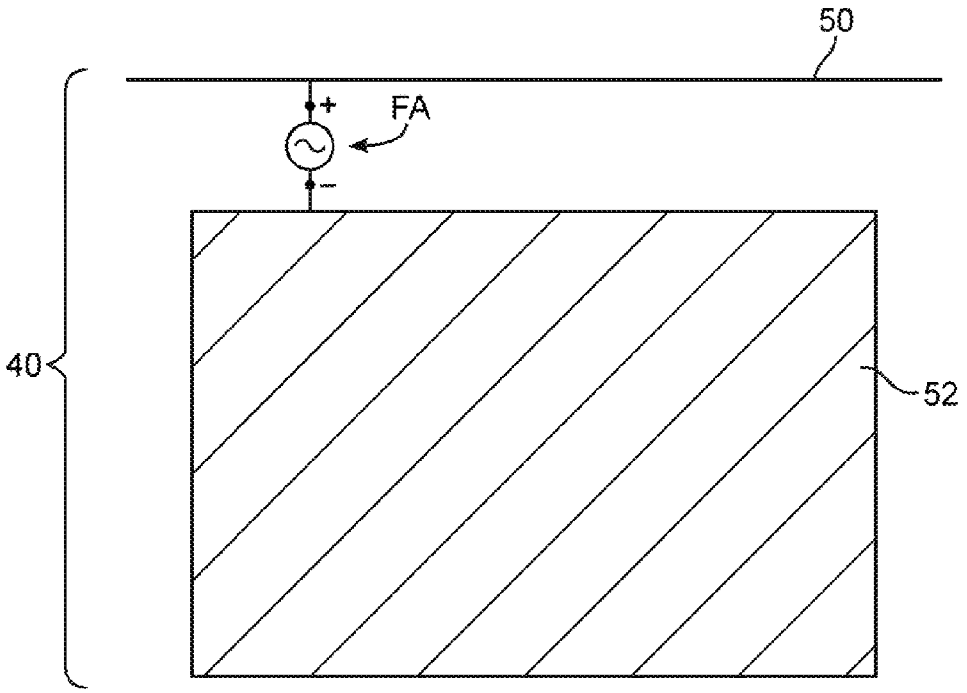
FIG. 10 is a diagram of an illustrative antenna with a feed in a first location in accordance with an embodiment of the present invention.
Figure 11:
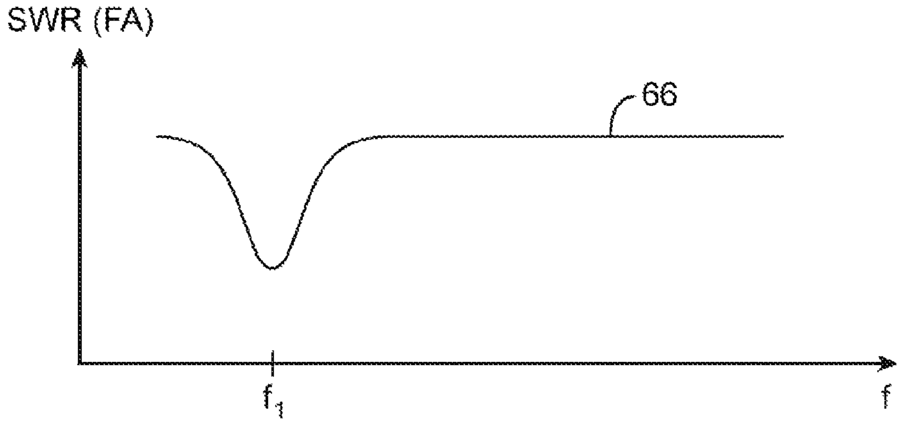
FIG. 11 is a graph in which antenna performance for an antenna configuration of the type shown in FIG. 10 has been plotted as a function of frequency in accordance with an embodiment of the present invention.

FIG. 10 is a diagram of antenna 40 in a configuration in which antenna 40 has only a single feed (feed FA). In the illustrative arrangement of FIG. 10, the conductive material that makes up antenna resonating element 50 and antenna ground 52 has been configured so that antenna 40 exhibits a resonance in a desired communications band when operated using feed FA. FIG. 11 is a graph in which antenna performance (standing wave ratio) for antenna 40 of FIG. 10 has been plotted as a function of operating frequency f. The illustrative communications band of interest in the example of FIGS. 10 and 11 is centered at frequency $f_1$, as indicated by the resonance peak at frequency $f_1$ in curve 66 of the graph of FIG. 11.

Figure 12:
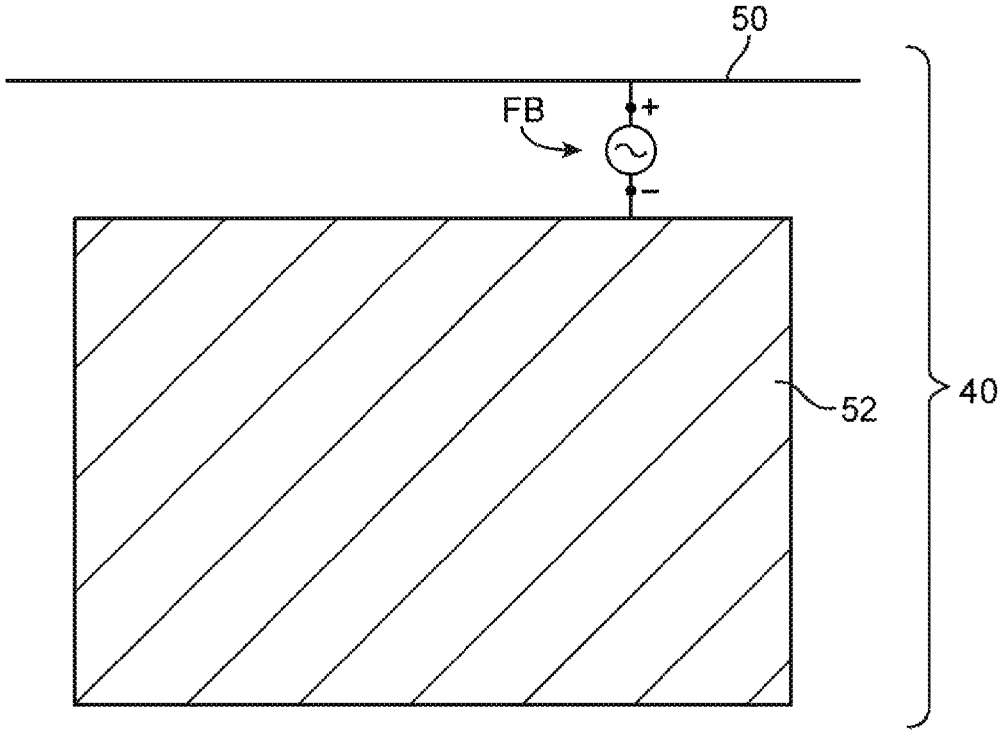
FIG. 12 is a diagram of an illustrative antenna of the type shown in FIG. 10 with a feed in a second location in accordance with an embodiment of the present invention.
Figure 13:
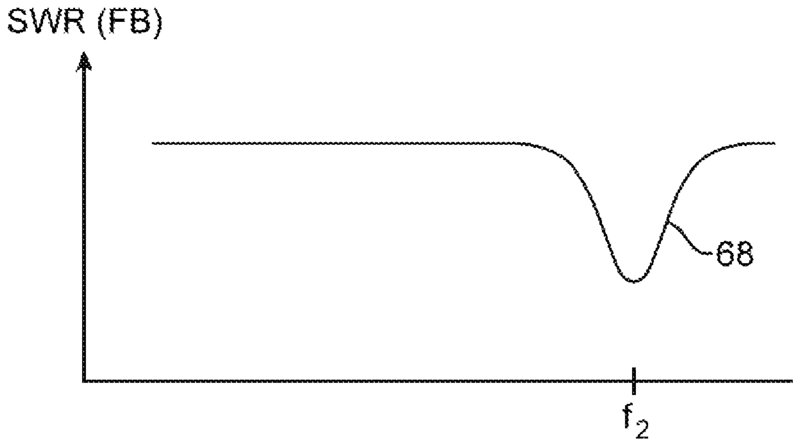
FIG. 13 is a graph in which antenna performance for an antenna configuration of the type shown in FIG. 12 has been plotted as a function of frequency in accordance with an embodiment of the present invention.

When the antenna structures of FIG. 10 are fed using a different antenna feed such as antenna feed FB of FIG. 12 instead of antenna feed FA, the frequency response of antenna 40 will be different. In particular, antenna 40 may be configured to exhibit a resonance in a different desired communications band when operated using feed FB. As shown by curve 68 of FIG. 13, for example, antenna 40 with feed FB of FIG. 12 may exhibit an antenna resonance covering a communications band centered at frequency $f_2$.

Figure 14:
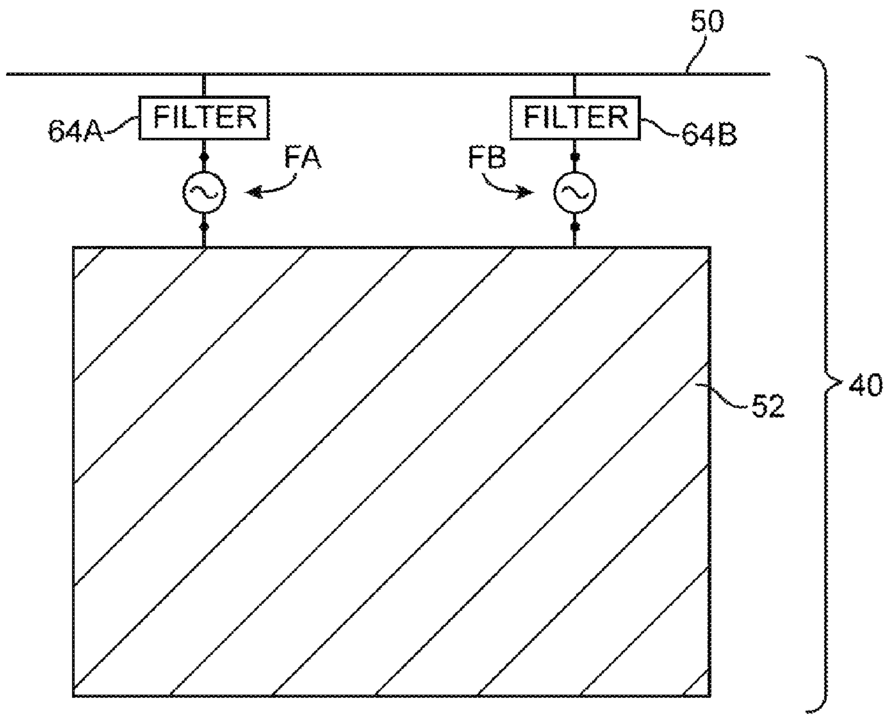
FIG. 14 is a diagram in which an antenna has been provided with feeds and filters in the first and second locations of FIGS. 10 and 12 in accordance with an embodiment of the present invention.

To allow wireless communications circuitry 34 (FIG. 2) of device 10 to operate in both the communications band at $f_1$ and the communications band at $f_2$, feeds FA and FB may be coupled to antenna 40 using respective filters 64A and 64B, as shown in FIG. 14. Filters 64A and 64B may be configured so that antenna 40 of FIG. 14 continues to exhibit the frequency response of curve 66 of FIG. 11 when using feed FA and continues to exhibit the frequency response of curve 68 of FIG. 13 when using feed FB, even though feeds FA and FB are both present in antenna 40.

In particular, filter 64A may be configured to form an impedance at frequencies near $f_1$ (e.g., in the communications band centered at frequency $f_1$) that allows signals at frequencies near frequency $f_1$ to pass through the filter. Filter 64A may also be configured to form an impedance (e.g., an open circuit or a short circuit) at frequencies near $f_2$, (e.g., in the communications band centered at frequency $f_2$) that effectively decouples the circuitry associated with feed FA from antenna 40 at frequencies near $f_2$. Filter 64B may be configured to form an impedance at frequencies near $f_2$ (e.g., in the communications band centered at frequency $f_2$) that allows signals at frequencies near frequency $f_2$ to pass through filter 64B. Filter 64B may also be configured to form an impedance (e.g., an open circuit or a short circuit) at frequencies near $f_1$, (e.g., in the communications band centered at frequency $f_1$) that effectively decouples the circuitry associated with feed FB from antenna 40 at frequencies near $f_1$.

Figure 15:
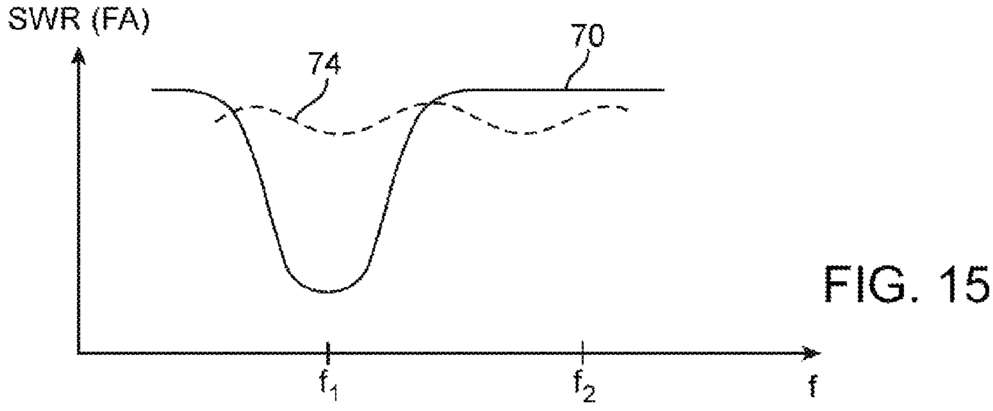
FIG. 15 is a graph in which antenna performance for an antenna configuration of the type shown in FIG. 14 has been plotted as a function of frequency when using the first feed of the antenna in accordance with an embodiment of the present invention.
Figure 16:
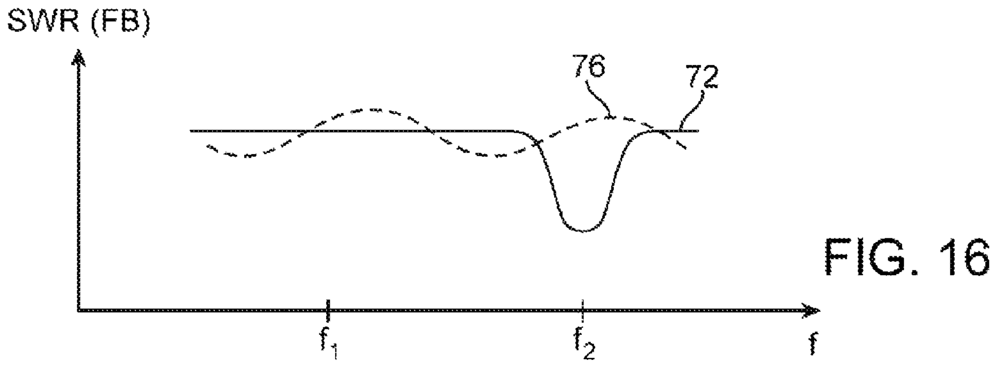
FIG. 16 is a graph in which antenna performance for an antenna configuration of the type shown in FIG. 14 has been plotted as a function of frequency when using the second feed of the antenna in accordance with an embodiment of the present invention.

Using this type of filter configuration, antenna 40 may exhibit a response of the type shown by curve 70 of FIG. 15 when using feed FA and a response of the type shown by curve 72 when using feed FB. At frequencies near frequency $f_1$, filter 64A will pass signals to be transmitted and/or received by antenna 40 using feed FA, whereas filter 64B will form an open circuit (or other impedance) that effectively disconnects feed FB from antenna 40 at frequencies near frequency $f_1$. When operating antenna 40 using feed FA at frequencies near $f_1$, antenna 40 of FIG. 14 will therefore be able to exhibit a frequency response similar to that of curve 66 of FIG. 11 (i.e., curve 70 of FIG. 15 will match curve 66 of FIG. 11). If filter 64B were instead configured to have an impedance that does not decouple feed FB from antenna 40 at frequencies near frequency $f_1$, feed FB would effectively be present during operation of feed FA. This could adversely affect the performance of antenna 40 (e.g., by producing a response curve such as response curve 74 of FIG. 15).

The frequency responses of filters 64A and 64B may likewise be used to isolate feed FB from feed FA when operating antenna 40 of FIG. 14 at frequencies near frequency $f_2$. In particular, antenna 40 may exhibit a response of the type shown by curve 72 of FIG. 16 when using feed FB because the impedance that is formed by filter 64B at frequencies near frequency $f_2$ will allow signals to be transmitted and/or received by antenna 40 through filter 64B using feed FB, while filter 64A forms an open circuit (i.e., a high impedance or other suitable impedance) that effectively disconnects feed FA from antenna 40 at frequencies near frequency $f_2$. As a result, antenna 40 of FIG. 14 will be able to exhibit a frequency response similar to that of curve 68 of FIG. 113 (i.e., curve 72 of FIG. 16 will match curve 68 of FIG. 13) using feed FB. If filter 64A were instead configured to have an impedance that does not decouple feed FA from antenna 40 at frequencies near frequency $f_2$, feed FA would effectively be present during operation of feed FB. This could adversely affect the performance of antenna 40 (e.g., by producing a response curve such as response curve 76 of FIG. 16).

Figure 17:
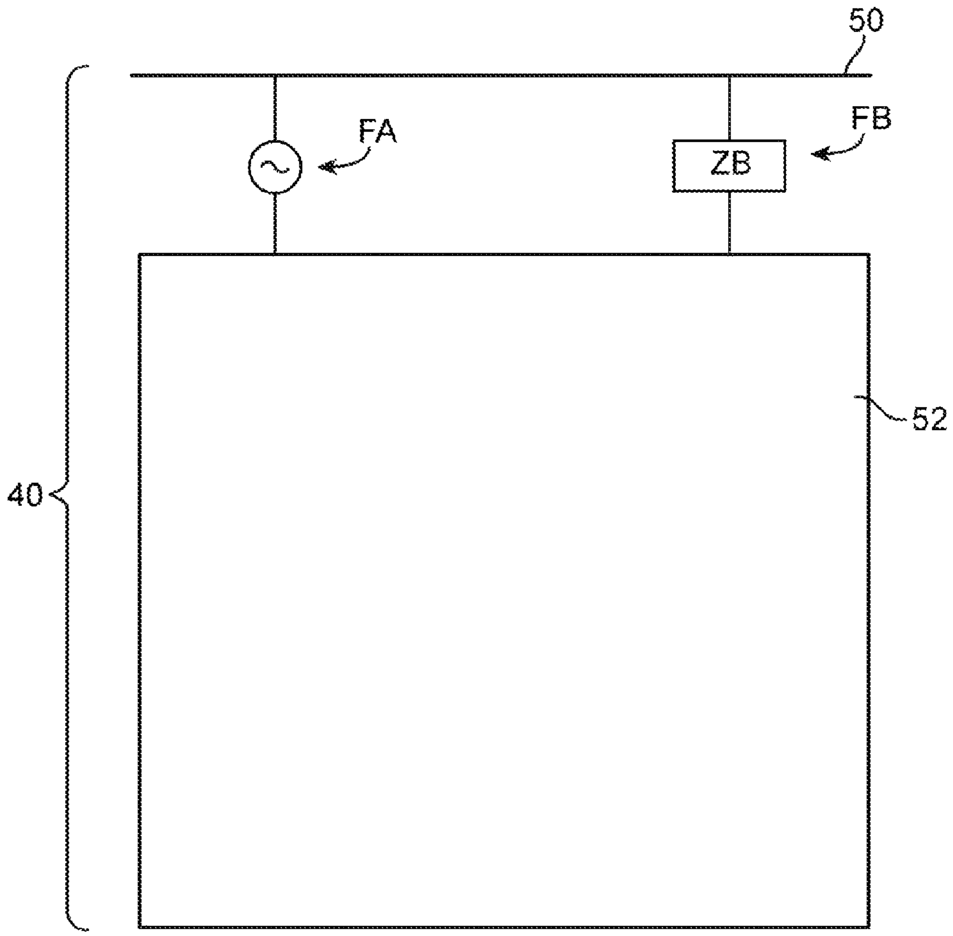
FIG. 17 is a diagram of an illustrative antenna with a feed in a first feed location and circuitry that provides an impedance in a second feed location during operation of the first feed in accordance with an embodiment of the present invention.

In general, filters 64A and 64B may be configured to have any suitable impedance versus frequency characteristics. Consider, as an example, a scenario of the type shown in FIGS. 17, 18, 19, and 20. As shown in FIG. 17, antenna 40 may be configured so that a desired frequency response such as the frequency response of curve 78 of FIG. 18 (i.e., a frequency resonance that peaks for a communications band centered at frequency $f_1$) is obtained when a given impedance value ZB is present in the location associated with feed FB during use of antenna feed FA (at least at frequencies in the vicinity of resonant frequency $f_1$). Antenna 40 may, at the same time, be configured so that a desired frequency response such as the frequency response of curve 80 of FIG. 20 (i.e., a frequency resonance that peaks for a communications band centered at frequency $f_2$) is obtained when an impedance ZA is present in the location associated with feed FA during use of antenna feed FB (at least at frequencies in the vicinity of resonant frequency $f_2$).

Figure 19:
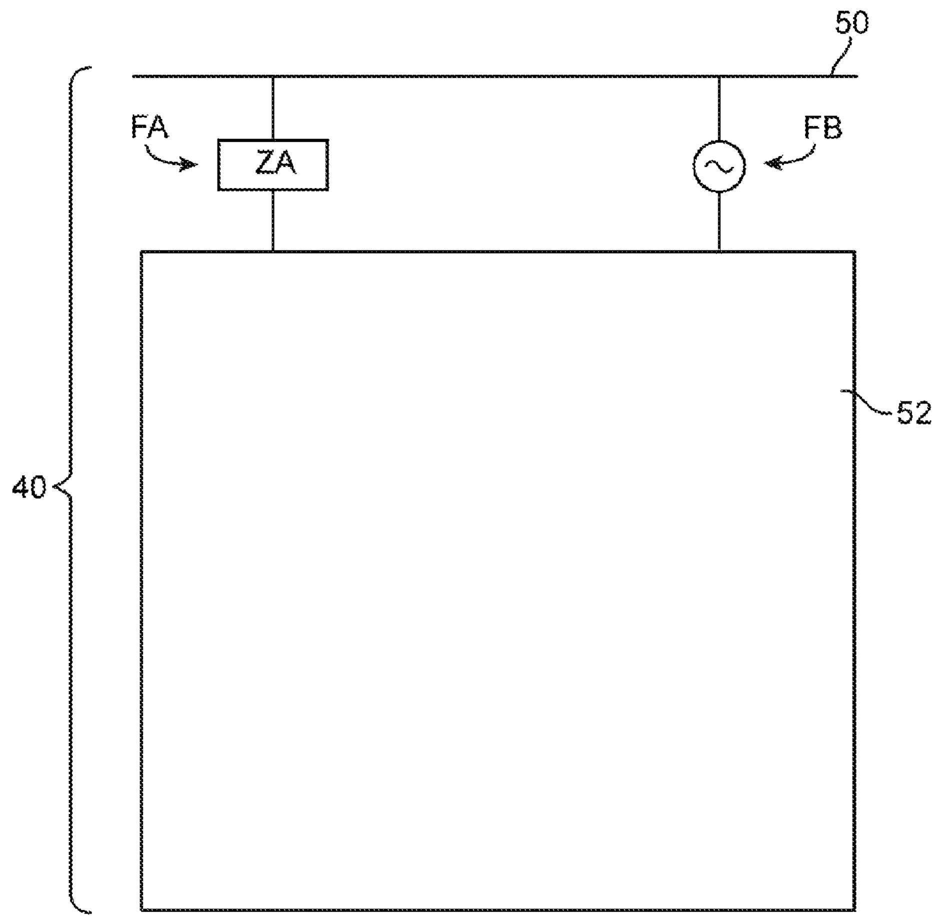
FIG. 19 is a diagram of an illustrative antenna with a feed in a second feed location and circuitry that provides an impedance in the first feed location of FIG. 18 during operation of the second feed in accordance with an embodiment of the present invention.
Figure 20:
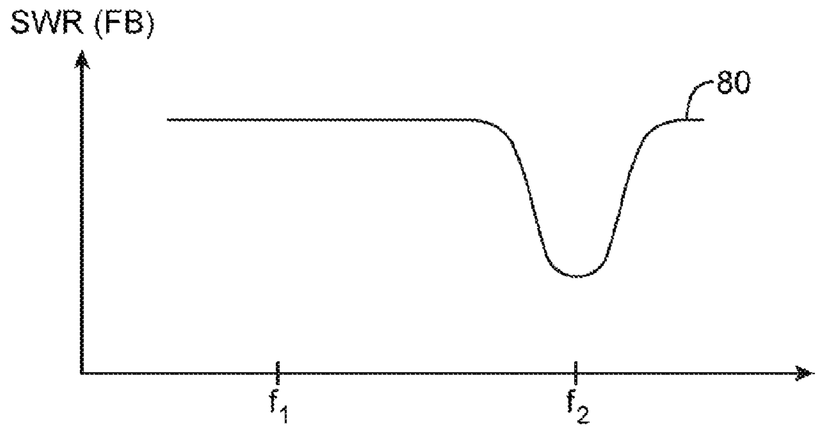
FIG. 20 is a graph in which antenna performance for an antenna configuration of the type shown in FIG. 19 has been plotted as a function of frequency in accordance with an embodiment of the present invention.

Antenna 40 of FIG. 14 may be provided with the same antenna resonating element 50 and ground plane 52 as the illustrative antenna structures of FIGS. 17 and 19. To ensure that the desired frequency response for antenna 40 is obtained when both feeds FA and FB are present, filter 64A may be configured to form an impedance at frequencies near frequency $f_1$ that allows signals to pass through filter 64A to antenna 40 at feed FA during operation at frequencies near $f_1$ and may be configured to form an impedance of ZA of FIG. 19 during operation at frequencies near frequency $f_2$. Filter 64B may be configured to form an impedance at frequencies near frequency $f_2$ that allows signals to pass through filter 64B to antenna 40 at feed FB during operation at frequencies near $f_2$ and may be configured to form a circuit with an impedance of ZB of FIG. 17 during operation at frequencies near frequency $f_1$.

Figure 18:
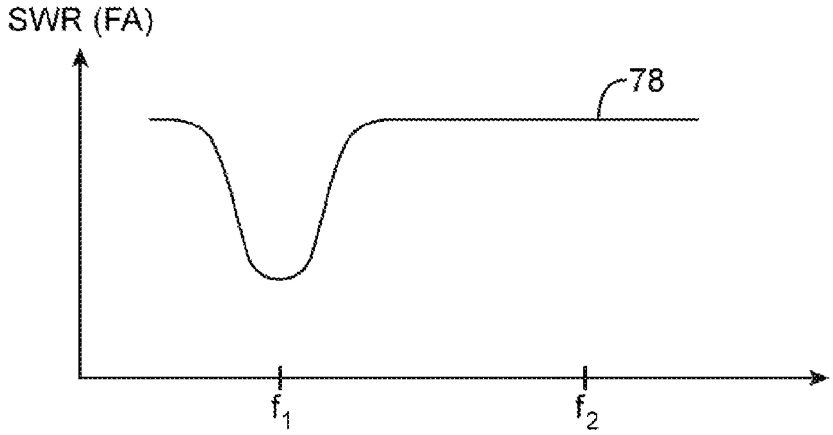
FIG. 18 is a graph in which antenna performance for an antenna configuration of the type shown in FIG. 17 has been plotted as a function of frequency in accordance with an embodiment of the present invention.

With this arrangement, use of feed FA will result in a frequency response (for antenna 40 of FIG. 14) such as curve 78 of FIG. 18 (because filter 64B will have impedance ZB as desired during operation in the communications band at frequency $f_1$). Use of feed FB will result in a frequency response (for antenna 40 of FIG. 14) such as curve 80 of FIG. 20 (because filter 64A will have impedance ZA as desired during operation in the communications band at frequency $f_2$).

Impedances ZA and ZB may, in general, have any complex values (e.g., with zero or non-zero real and imaginary parts). For example, Z1 may be associated with a particular value of capacitance between resonating element 50 and ground 52, may be associated with a particular inductance between resonating element 50 and ground 52, may be associated with parallel inductive and capacitive components, may exhibit a short circuit behavior at particular frequencies, may produce an open circuit at particular frequencies, etc.

Figure 21:
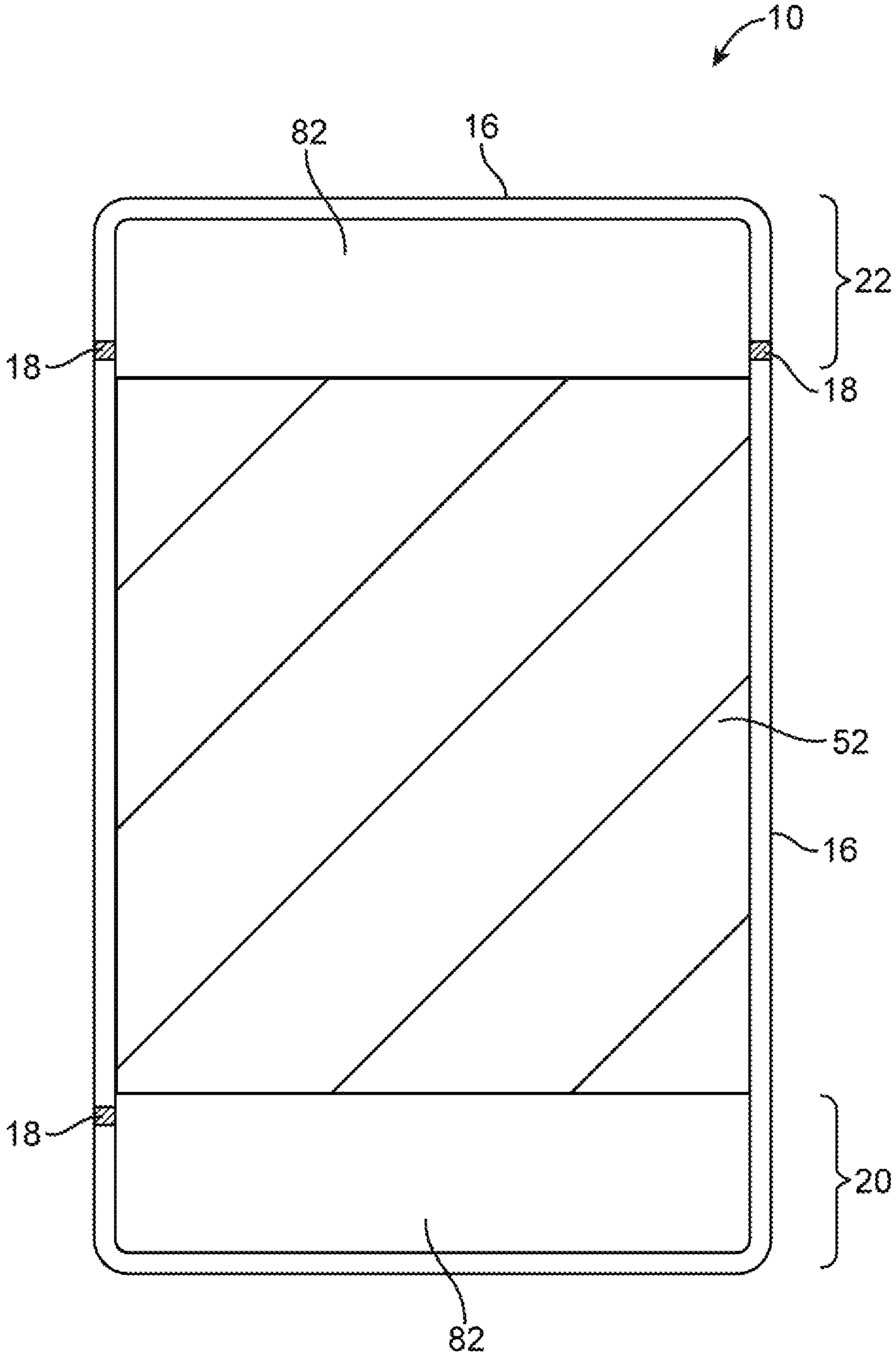
FIG. 21 is a diagram of an illustrative electronic device of the type shown in FIG. 1 showing how structures in the device may form a ground plane and antenna resonating element structures in accordance with an embodiment of the present invention.

A top interior view of device 10 in a configuration in which device 10 has a peripheral conductive housing member such as housing member 16 of FIG. 1 with one or more gaps 18 is shown in FIG. 21. As shown in FIG. 21, device 10 may have an antenna ground plane such as antenna ground plane 52. Ground plane 52 may be formed from traces on printed circuit boards (e.g., rigid printed circuit boards and flexible printed circuit boards), from conductive planar support structures in the interior of device 10, from conductive structures that form exterior parts of housing 12, from conductive structures that are part of one or more electrical components in device 10 (e.g., parts of connectors, switches, cameras, speakers, microphones, displays, buttons, etc.), or other conductive device structures. Gaps such as gaps 82 may be filled with air, plastic, or other dielectric.

One or more segments of peripheral conductive member 16 may serve as antenna resonating elements such as antenna resonating element 50 of FIG. 3. For example, the uppermost segment of peripheral conductive member 16 in region 22 may serve as an antenna resonating element for an antenna in device 10. The conductive materials of peripheral conductive member 16, the conductive materials of ground plane 52, and dielectric openings 82 (and gaps 18) may be used in forming one or more antennas in device 10 such as an upper antenna in region 22 and a lower antenna in region 20. Configurations in which an antenna in upper region 22 is implemented using a dual feed arrangement of the type described in connection with FIG. 14 are sometimes described herein as an example.

Figure 22:
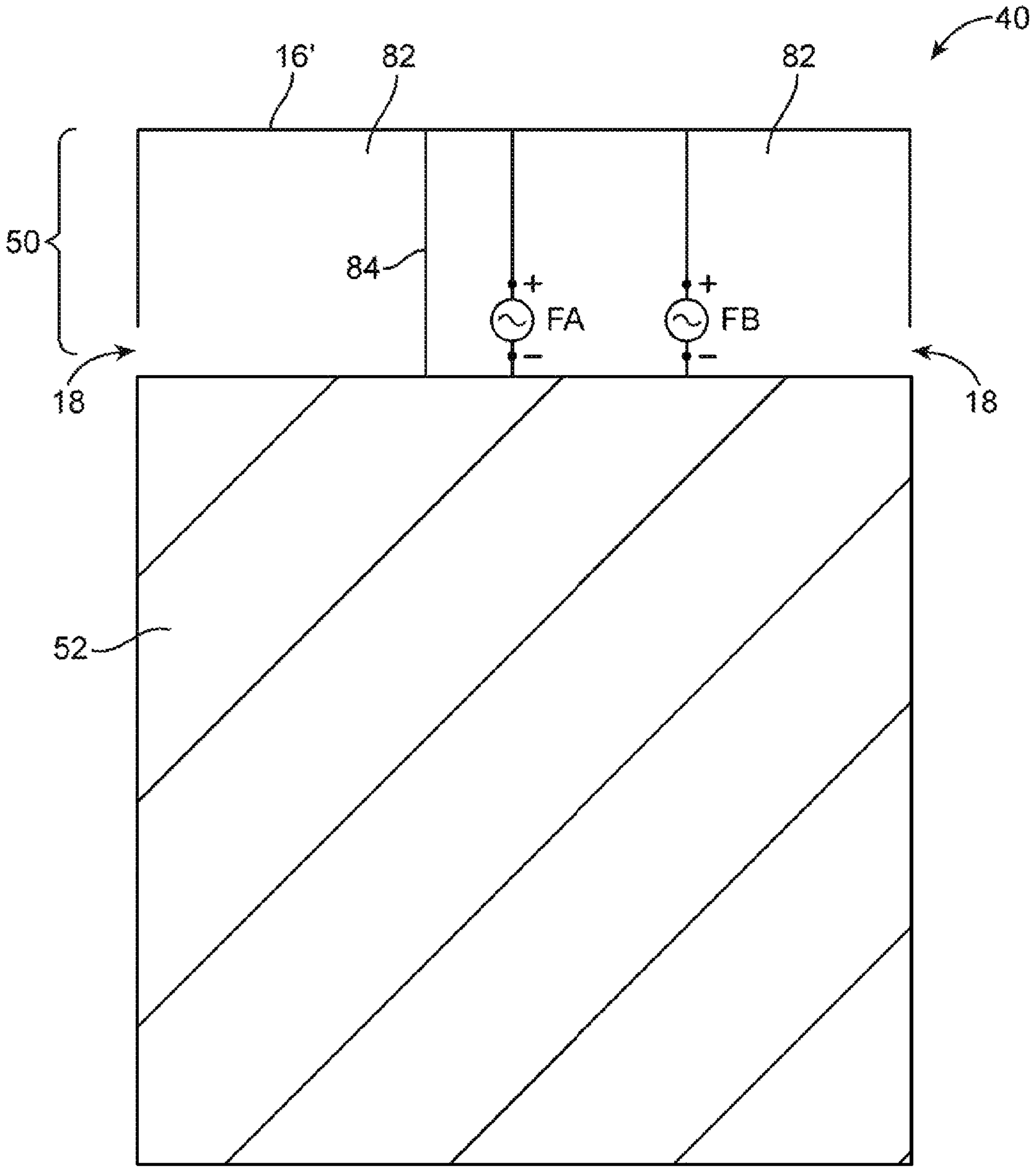
FIG. 22 is a diagram showing how device structures of the type shown in FIG. 21 may be used in forming an antenna with multiple feeds in accordance with an embodiment of the present invention.

Using a device configuration of the type shown in FIG. 22, a dual-feed antenna such as antenna 40 of FIG. 22 may be implemented (e.g., a dual-feed inverted-F antenna). Segment 16' of the peripheral conductive member (see, e.g., peripheral conductive member 16 of FIG. 21) may form antenna resonating element 50. Ground plane 52 may be separated from antenna resonating element 50 by gap 82. Gaps 18 may be formed at either end of segment 16' and may have associated parasitic capacitances. Conductive path 84 may form a short circuit path between antenna resonating element (i.e., segment 16') and ground 52. First antenna feed FA and second antenna feed FB may be located at different locations along the length of antenna resonating element 50, as described in connection with the example of FIG. 14.

Figure 23:
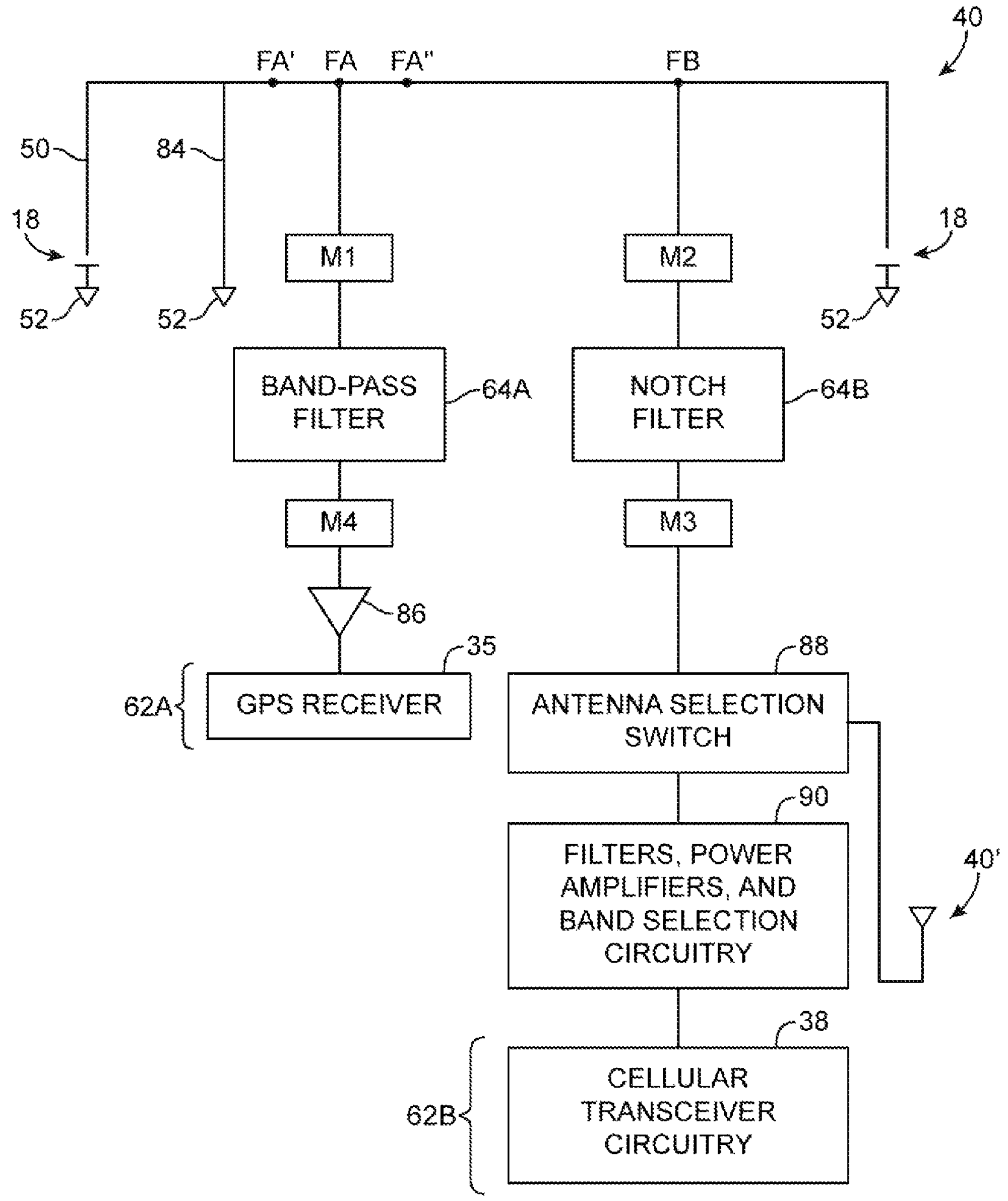
FIG. 23 is a diagram of an antenna of the type shown in FIG. 22 with multiple feeds and associated wireless circuitry such as filters and matching circuits in accordance with an embodiment of the present invention.

As shown in FIG. 23, it may be desirable to provide each of the feeds of antenna 40 with filter circuitry and impedance matching circuitry. In a configuration of the type shown in FIG. 23, antenna resonating element 50 may be formed from a segment of peripheral conductive member 16 (e.g., segment 16' of FIG. 22). Antenna ground 52 may be formed from ground plane structures such as ground plane structure 52 of FIG. 21. Antenna 40 of FIG. 23 may be, for example, an upper antenna in region 22 of device 10 (e.g., an inverted-F antenna). Device 10 may also have additional antennas such as antenna 40' (e.g., an antenna formed in lower portion 20 of device 10, as shown in FIG. 21).

In the illustrative example of FIG. 23, satellite navigation receiver 35 (e.g., a Global Positioning System receiver or a receiver associated with another satellite navigation system) may serve as a first transceiver for device 10 such as transceiver 62A of FIG. 9, whereas cellular telephone transceiver circuitry 38 (e.g., a cellular telephone transmitter and a cellular telephone receiver) may serve as a second transceiver for device 10 such as transceiver 62B of FIG. 9. If desired, other types of transceiver circuitry may be used in device 10. The example of FIG. 23 is merely illustrative.

As shown in FIG. 23, receiver 35 may be coupled to antenna 40 at first antenna feed FA and transceiver 38 may be coupled to antenna 40 at second antenna feed FB.

Incoming signals for receiver 35 may be received through band-pass filter 64A, optional impedance matching circuits such as matching circuits M1 and M4, and low noise amplifier 86. The signals received from feed FA may be conveyed through components such as matching filter M1, band-pass filter 64A, matching circuit M4, and low noise amplifier 86 using transmission lines paths such as transmission line path 54A (see, e.g., FIGS. 3 and 9). Additional components may be interposed in transmission line path 54A, if desired.

Signals associated with transmit and receive operations for cellular transceiver circuitry 38 may be handled using notch filter 64B, optional impedance matching circuits such as matching circuits M2 and M3, antenna selection switch 88, and circuitry 90. Antenna selection switch 88 may have a first state in which antenna 40 is coupled to transceiver 38 and a second state in which antenna 40' is coupled to transceiver 38 (as an example). If desired, switch 88 may be a cross-bar switch that couples either antenna 40 or antenna 40' to transceiver 38 while coupling the remaining antenna to another transceiver.

Circuitry 90 may include filters (e.g., duplexers, diplexers, etc.), power amplifier circuitry, band selection switches, and other components. The components used in transmitting and receiving signals with feed FB may be conveyed through components such as matching filter M2, notch filter 64B, matching circuit M3, and circuitry 90 using transmission lines paths such as transmission line path 54B (see, e.g., FIGS. 3 and 9). Additional components may be interposed in transmission line path 54B, if desired.

Figure 24:
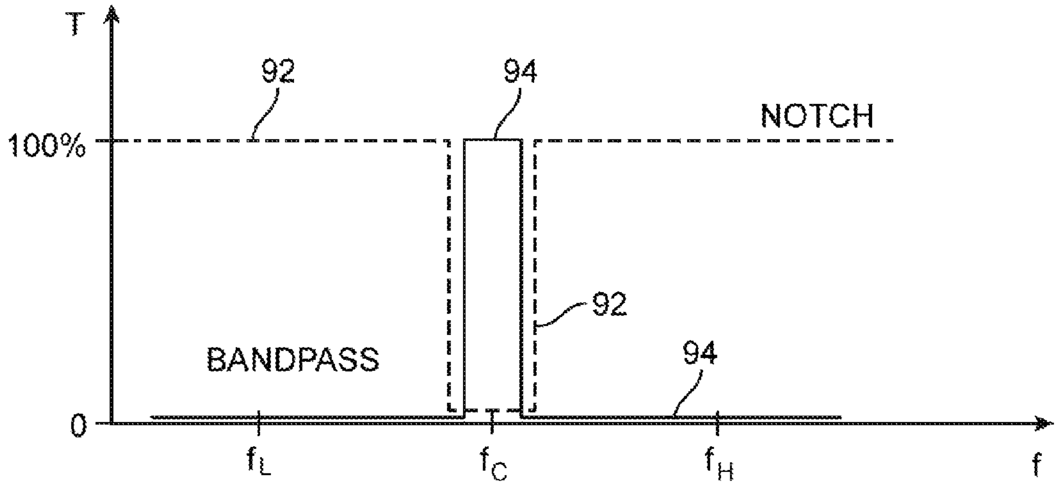
FIG. 24 is a diagram showing how frequency responses of filter circuitry associated with the first and second antenna feeds of FIG. 23 may be configured in accordance with an embodiment of the present invention.

The transmission T that may be exhibited by notch filter 64B and band-pass filter 64A as a function of frequency f is shown in FIG. 24. In the graph of FIG. 24, the transmission of notch filter 64B is represented by the transmission characteristic of line 92, whereas the transmission of band-pass filter 64A is represented by the transmission characteristic of line 94. As indicated by line 94, band-pass filter 64A may pass signals with frequencies in a passband centered at frequency $f_C$ and may block lower and higher frequencies such as frequencies $f_L$ and $f_H$. As indicated by line 92, notch filter 64B may have a transmission characteristic that is complementary to that of band-pass filter 64A. In particular, notch filter 64B may block signals in a frequency band centered around frequency $f_C$ while passing lower frequency signals in the vicinity of frequency $f_L$ and while passing higher frequency signals in the vicinity of frequency $f_H$ (i.e., notch filter 64B may have a stopband that overlaps the passband of band-pass filter 64A).

Figure 25:
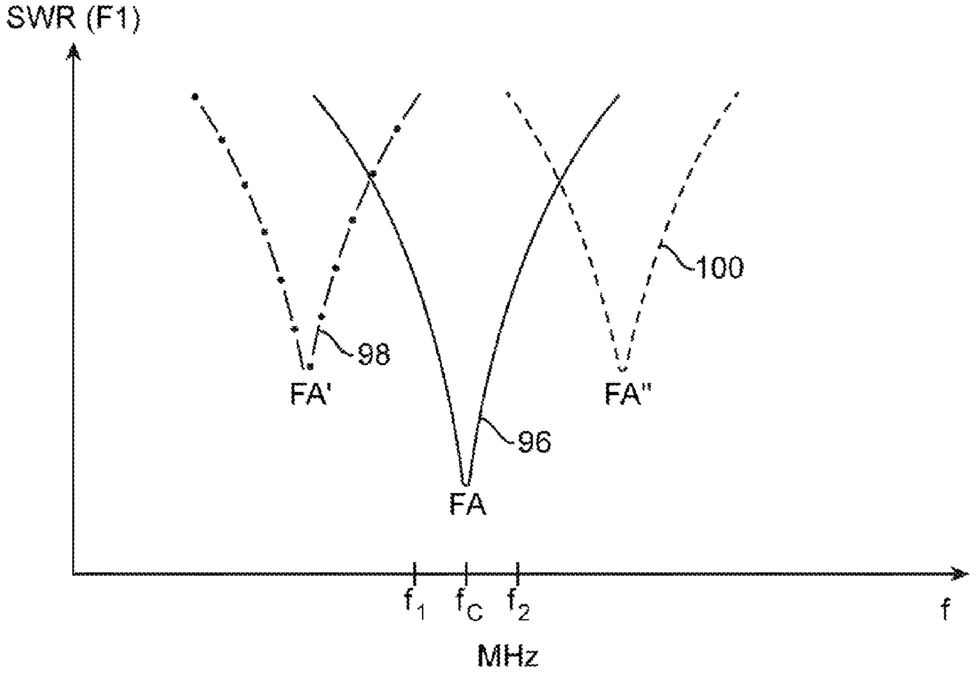
FIG. 25 is a graph of antenna performance associated with use of the first antenna feed of FIG. 23 in accordance with an embodiment of the present invention.
Figure 26:
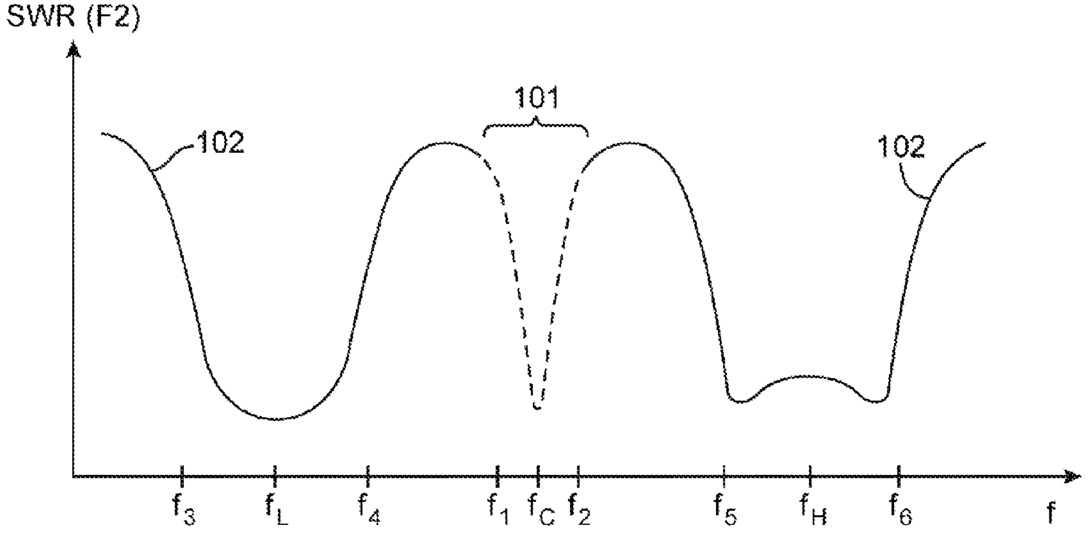
FIG. 26 is a graph of antenna performance associated with use of the second antenna feed of FIG. 23 in accordance with an embodiment of the present invention.
Figure 27:
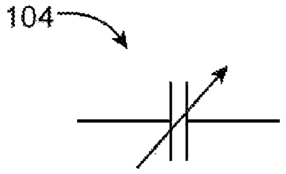
FIG. 27 is a diagram of an illustrative antenna tuning element based on a variable capacitor in accordance with an embodiment of the present invention.
Figure 28:
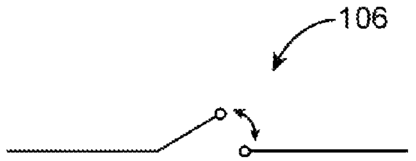
FIG. 28 is a diagram of an illustrative antenna tuning element based on a switch in accordance with an embodiment of the present invention.
Figure 29:
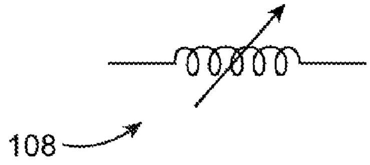
FIG. 29 is a diagram of an illustrative antenna tuning element based on a variable inductor in accordance with an embodiment of the present invention.

FIGS. 25 and 26 are graphs in which antenna performance (i.e., standing wave ratio) has been plotted as a function of frequency for antenna 40 using antenna feeds FA and FB, respectively. Three performance curves are shown in FIG. 25. Curve 96 corresponds to the performance of antenna 40 of FIG. 23 when feed FA is in the position shown in FIG. 23. The location of feed FA (in this example) has been chosen to maximize antenna performance at frequencies surrounding frequency $f_C$ (e.g., at frequencies surrounding 1575 MHz in a configuration in which receiver 35 is a Global Positioning System receiver). Alteration of the position of feed FA to position FA' or FA" of FIG. 23 may result in detuning and reduced antenna performance, as indicated by lines 98 and 100, respectively, in FIG. 25. Signals at frequencies surrounding frequency $f_C$ (i.e., signals with frequencies between frequency $f_1$ and $f_2$) may be passed to receiver 35 via the passband of band-pass filter 64A. Out-of-band signals at frequencies (i.e., signals below $f_1$ and above $f_2$) will be attenuated by band-pass filter 64A. The ability to position feed FA in an portion of antenna 40 in which antenna performance at frequency $f_C$ has been maximized may help device 10 receive and process satellite navigation system signals (or other suitable signals) using a receiver such as receiver 35.

The illustrative antenna performance curve of FIG. 26 (curve 102) corresponds to the performance of antenna 40 when feed FB and cellular telephone transceiver circuitry 38 are being used to transmit and receive radio-frequency signals (e.g., using feed FB in the position shown in FIG. 23). The location of feed FB (in this example) has been chosen to maximize antenna performance for transceiver circuitry 38 at frequencies surrounding frequency $f_L$ (e.g., at cellular telephone low-band frequencies from $f_3$ to $f_4$) and at frequencies surrounding frequency $f_H$ (e.g., at high-band cellular telephone frequencies from $f_5$ to $f_6$). Frequencies $f_3$, $f_4$, $f_5$, and $f_6$ may be, as examples, 700 MHz, 960 MHz, 1700 MHz, and 2200 MHz. Antenna 40 may be configured to cover other frequencies if desired (e.g., by shifting the position of feed FB, by changing the size and shape of resonating element 50, etc.).

Notch filter 64B is configured to pass signals below frequency $f_1$ (i.e., signals in the communications band extending from frequency $f_3$ to $f_4$) and is configured to pass signals above frequency $f_2$ (i.e., signals in the communications band extending from frequency $f_5$ to $f_6$). The stopband portion of notch filter 64B may block signals with frequencies between $f_1$ and $f_2$ (i.e., the Global Positioning System signals that are handled by receiver 35), as indicated by blocked portion 101 of curve 102 of the graph of FIG. 26.

Filters 64A and 64B of antenna 40 of FIG. 23 operate as described in connection with FIG. 14. During use of receiver 35 and feed FA to receive signals in the band at $f_C$, filter 64A may have an impedance that couples feed FA to antenna resonating element 50 of FIG. 23 and allows the signals in the band at $f_C$ to reach receiver 35. Filter 64B may have an impedance at frequency $f_C$ that effectively disconnects the circuitry that is coupled to feed FB from antenna 40 (i.e., transceiver 38 may effectively be decoupled from antenna 40 at frequency $f_C$). During use of transceiver 38 and feed FB to transmit and receive signals in the bands at $f_L$ and $f_H$, filter 64B may have an impedance that couples feed FB to antenna resonating element 50 of FIG. 23 and allows the signals in the bands at $f_L$ and $f_H$ to reach transceiver 38. Filter 64A may have an impedance at frequencies in the bands at $f_L$ and $f_H$ that effectively disconnects the circuitry that is coupled to feed FA from antenna 40 (i.e., receiver 35 may be effectively decoupled from antenna 40 at frequencies in the bands at $f_L$ and $f_H$).

With one suitable arrangement, filter 64A may have a high impedance in the bands at $f_L$ and $f_H$ to effectively disconnect the circuitry that is coupled to feed FA from antenna 40. Low impedances (short circuits) may also be used in decoupling receiver 35 and the other circuitry of feed FA from antenna 40 during operation in the frequencies associated with feed FB. For example, filter 64A may be configured to exhibit a short circuit (low impedance) condition at frequencies above $f_2$ (e.g., at frequencies from $f_5$ to $f_6$), rather than an open circuit condition. When exposed to this short circuit, signals at frequencies from $f_5$ to $f_6$ may be reflected from filter 64A with a phase shift of 180°. The short circuit may thereby effectively disconnect the circuitry that is coupled to feed FA from antenna 40. Regardless of whether filter 64A forms an open circuit at frequencies of $f_3$ to $f_4$ and at frequencies of $f_5$ to $f_6$, whether filter forms an open circuit at frequencies of $f_3$ to $f_4$ while forming a short circuit at frequencies of $f_5$ to $f_6$, or whether other suitable configurations are used, filters 64A and 64B may be configured to allow feed FA to be optimized to support operation of receiver 35 without being adversely affected by the presence of the circuitry coupled to feed FB, while allowing feed FB to be optimized to support operation of transceiver 38 without being adversely affected by feed FA.

If desired, device 10 may be provided with tunable components that can be used in tuning antenna 40. For example, filters such as filters 64A and 64B and matching circuits such as optional matching circuits M1, M2, M3, and M4 may be implemented using tunable components (or, if desired, fixed components). With one suitable arrangement, matching circuits such as matching circuits M2 and M4 of FIG. 23 may be omitted, matching circuit M1 of FIG. 23 may be implemented using a fixed matching circuit, and matching circuit M3 of FIG. 23 may be implemented using a tunable matching circuit.

The circuitry of tunable matching circuit M3 (or other tunable antenna circuits) may be implemented using one or more adjustable components. Examples of adjustable components are shown in FIGS. 27, 28, 29, 30, and 31. If desired, antenna 40 may be tuned using a tunable capacitor (variable capacitor) such as variable capacitor 104 of FIG. 27, may be tuned using a radio-frequency switch such as switch 106 of FIG. 28, may be tuned using a variable inductor such as variable inductor 108 of FIG. 29, may be tuned using an adjustable capacitor such as adjustable capacitor 110 of FIG. 30, may be tuned using an adjustable inductor such as adjustable inductor 112 of FIG. 31, and may be tuned using other adjustable components and combinations of two or more of such components (e.g., combinations of tunable and/or fixed components).

Figure 30:
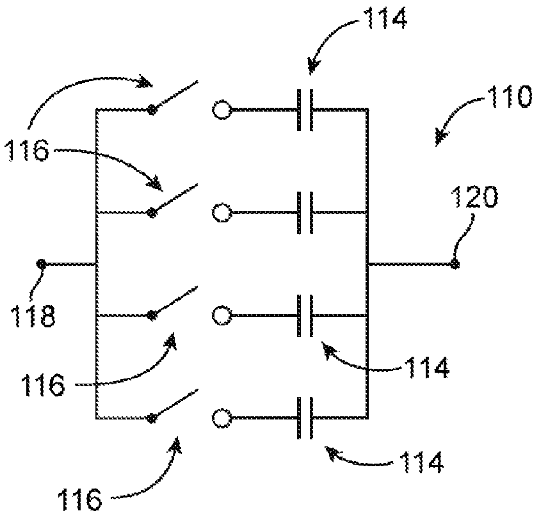
FIG. 30 is a diagram of an illustrative antenna tuning element based on a switch-based adjustable capacitor in accordance with an embodiment of the present invention.

Adjustable capacitor 110 of FIG. 30 may include an array of capacitors 114 and associated switches 116 for selectively switching one or more of capacitors 114 into place between adjustable capacitor terminals 118 and 120. The states of switches 116 may be controlled by control signals from control circuitry in device 10 (e.g., a baseband processor in storage and processing circuitry 28 of FIG. 2). Capacitors 114 may be selectively coupled in parallel between terminals 118 and 120 as shown in FIG. 30. Other configurations for adjustable capacitor 110 may be used, if desired. For example, configurations in which capacitors are connected in series and are provide with switch-based selective bypass paths may be used, configurations with combinations of parallel and series-connected capacitors may be used, etc.

Figure 31:
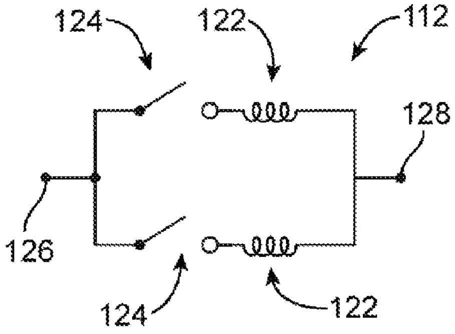
FIG. 31 is a diagram of an illustrative antenna tuning element based on a switch-based adjustable inductor in accordance with an embodiment of the present invention.

Adjustable inductor 112 of FIG. 31 may include an array of inductors 122 and associated switches 124 for selectively switching one or more of inductors 122 into place between adjustable inductor terminals 126 and 128. Inductors 122 may, for example, be selectively coupled in parallel between terminals 126 and 128. The states of switches 124 may be controlled by control signals from control circuitry in device 10 (e.g., a baseband processor in storage and processing circuitry 28 of FIG. 2). Other configurations for adjustable inductor 112 may be used, if desired (e.g., configurations in which inductors are connected in series and are provide with switch-based selective bypass paths, configurations with combinations of parallel and series-connected inductors, etc.).

Figure 32:
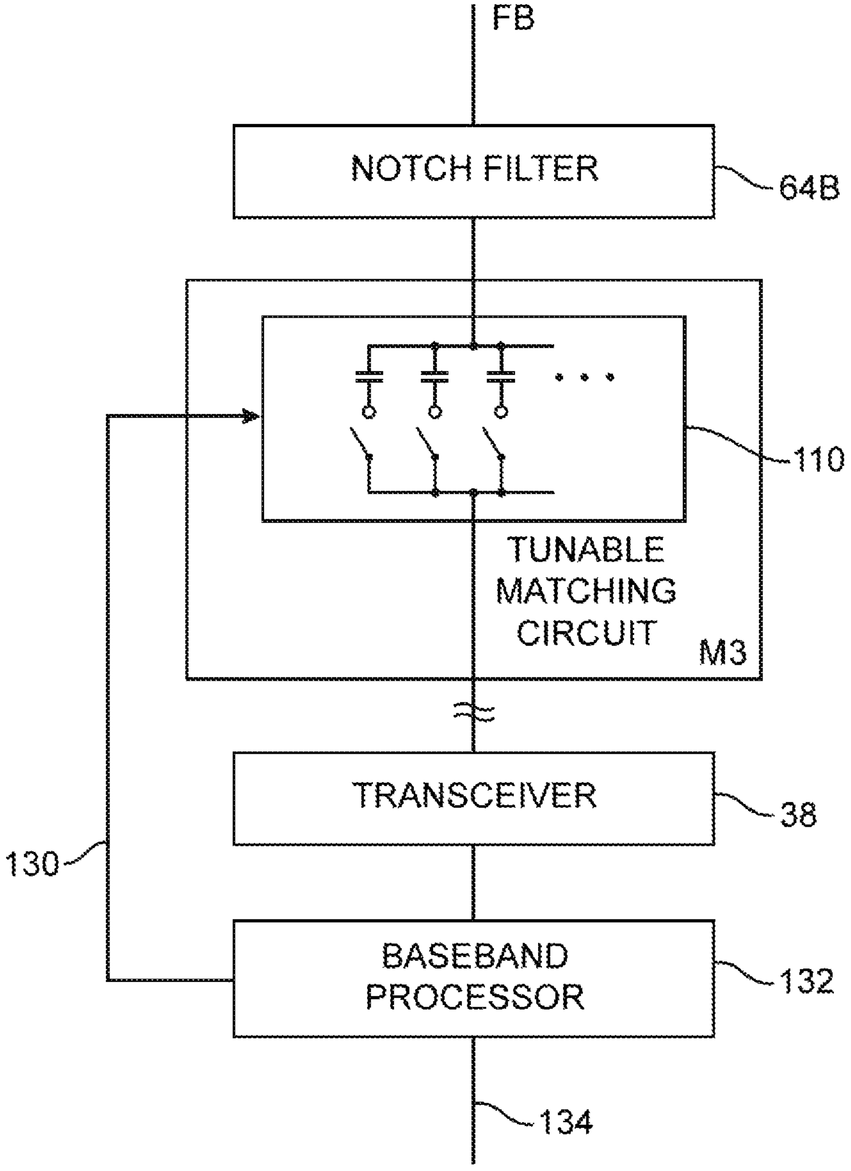
FIG. 32 is a diagram showing adjustable antenna circuitry that may be associated with the second antenna feed of FIG. 23 in accordance with an embodiment of the present invention.

FIG. 32 is a diagram of a portion of the circuitry of FIG. 23 that is associated with feed FB showing how impedance matching circuitry M3 may be implemented using tunable circuitry. Tunable matching circuit M3 may, for example, be provided with a tunable capacitor such as switched-based adjustable capacitor 110. Tunable matching circuit M3 and other circuitry in antenna 40 (e.g., matching circuits such as matching circuits M1, M2, M4, filters 64A and 64B, etc.) may, in general, include inductors, capacitors, resistors, continuously variable inductors, continuously variable resistors, continuously variable capacitors, switch-based adjustable capacitors such as switch-based adjustable capacitor 114 of FIG. 30, switch-based adjustable inductors such as switch-based adjustable inductor 112 of FIG. 31, switches, conductive lines, and additional fixed and/or adjustable components.

As shown in FIG. 32, adjustable components such as adjustable capacitor 110 of matching circuit M3 may be controlled by control signals provided over signal path 130. Path 130 may include one or more conductive lines (e.g., two or more lines, three lines or more than three lines, etc.) that carry control signals to respective switches 116 in adjustable capacitor 114 from control circuitry such as baseband processor 132 (e.g., control circuitry such as storage and processing circuitry 28 of FIG. 2). During operation, baseband processor 132 may receive digital data that is to be transmitted from storage and processing circuitry 28 at path 134 and may use radio-frequency transceiver circuitry 38 to transmit corresponding radio-frequency signals over antenna 40 through matching circuit M3 and notch filter 64B at feed FB. During data reception operations, baseband processor 132 may receive signals using transceiver 38 and may provide corresponding data to path 134.

Figure 33:
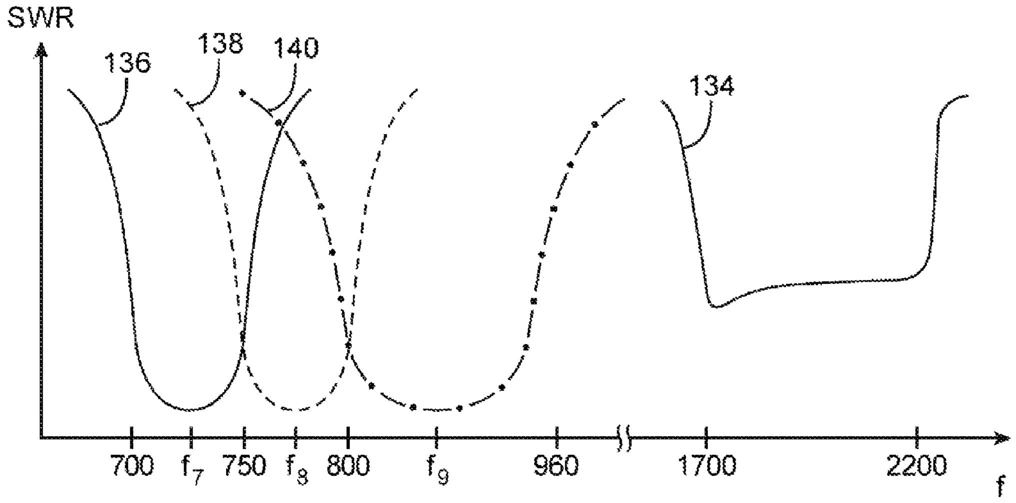
FIG. 33 is a graph in which antenna performance has been plotted as a function of frequency for an antenna of the type shown in FIG. 23 using adjustable circuitry of the type shown in FIG. 32 in accordance with an embodiment of the present invention.

FIG. 33 is a graph in which antenna performance (standing wave ratio) has been plotted as a function of operating frequency for antenna 40 using feed FB and the circuitry of FIG. 32. In the illustrative configuration of antenna 40 of FIG. 23 in which matching circuits M2 and M4 have been omitted, in which matching circuit M1 has been implemented using fixed impedance matching circuitry, and in which impedance matching circuit M3 has been implemented using one or more tunable components such as switch-based adjustable capacitor 110 of FIG. 32, the performance of antenna 40 at high-band frequencies is relatively unaffected by the state of adjustable capacitor 110. As a result, portion 134 of the antenna performance curve of FIG. 33 is relatively constant regardless of the state of capacitor 110. Portion 134 may, for example, cover a frequency range of about 1700 MHz (e.g., frequency $f_5$ of FIG. 26) to a frequency of about 2200 MHz (e.g., frequency $f_6$ of FIG. 26).

At lower frequencies such as frequencies from 700 MHz (e.g., frequency $f_3$ of FIG. 26) to 960 MHz (e.g., frequency $f_4$ of FIG. 26), a single antenna resonance peak can be tuned to cover a lower sub-band centered at frequency $f_7$ (as shown by curve 136), a middle sub-band centered at frequency $f_8$ (as shown by curve 138), and an upper sub-band centered at frequency $f_9$ (as shown by curve 140).

Adjustable capacitor 110 may have three states exhibiting respectively distinct capacitance values C1, C2, and C3 (e.g., capacitances in the range of about 0.5 pF to about 10 pF). When capacitor 110 is placed in its C1 state, antenna 40 may exhibit a response corresponding to curves 136 and 134. When capacitor 110 is placed in its C2 state, antenna 40 may exhibit a response corresponding to curves 138 and 134. Antenna 40 may exhibit a response corresponding to curves 140 and 134 when capacitor 110 is placed in its C3 state. Configurations for tunable matching circuit M3 that exhibit more than three states or fewer than three states may also be used. The use of an adjustable capacitor and matching circuit such as matching circuit M3 of FIG. 32 that may be adjusted between three different tuning states is merely illustrative.

The foregoing is merely illustrative of the principles of this invention and various modifications can be made by those skilled in the art without departing from the scope and spirit of the invention.

What is claimed is:

1. An electronic device, comprising:

an antenna;

a first antenna feed at a first location in the antenna;

a second antenna feed at a second location in the antenna;

a first radio-frequency receiver that is configured to receive radio-frequency signals from the antenna in a first communications band;

a second radio-frequency receiver that is configured to receive radio-frequency signals from the antenna in a second communications band;

a first filter coupled between the first radio-frequency receiver and the first antenna feed, wherein the first filter is configured to pass the radio-frequency signals in the first communications band and is configured to block the radio-frequency signals in the second communications band; and a second filter coupled between the second radio-frequency receiver and the second antenna feed, wherein the second filter is configured to pass the radio-frequency signals in the second communications band and is configured to block the radio-frequency signals in the first communications band, wherein the second filter comprises a notch filter.

2. The electronic device defined in claim 1 wherein the first filter comprises a band-pass filter.

3. The electronic device defined in claim 2 wherein the band-pass filter has a passband and wherein the notch filter has a stopband that overlaps the passband.

4. The electronic device defined in claim 3 wherein the first radio-frequency receiver comprises a satellite navigation system receiver.

5. The electronic device defined in claim 4 wherein the second radio-frequency receiver comprises a cellular telephone receiver.

6. The electronic device defined in claim 5 wherein the cellular telephone receiver is configured to operate in a third communications band, wherein the second filter is configured to pass radio-frequency signals in the third communications band.

7. The electronic device defined in claim 6 wherein the third communications band includes frequencies lower than the stopband and wherein the second communications band includes frequencies higher than the stop band.

8. The electronic device defined in claim 7 further comprising a tunable circuit coupled to the notch filter that is configured to tune the antenna to cover the third communications band.

9. The electronic device defined in claim 8 wherein the tunable circuit comprises a switch-based adjustable capacitor configured to exhibit at least first and second selectable capacitances.

10. The electronic device defined in claim 1 further comprising a tunable circuit coupled to the second filter that is configured to tune the antenna.

11. The electronic device defined in claim 10 wherein the tunable circuit comprises a switch-based adjustable capacitor having at least first and second selectable capacitances.

12. The electronic device defined in claim 11 further comprising a signal path coupled between the second antenna feed and the second radio-frequency receiver, wherein the switch-based adjustable capacitor is interposed within the path between the second antenna feed and the second radio-frequency receiver, and wherein the second filter is interposed between the second antenna feed and the switch-based adjustable capacitor.

13. The electronic device defined in claim 12 wherein the first radio-frequency receiver comprises a satellite navigation system receiver and wherein the second radio-frequency receiver comprises a cellular telephone receiver.

14. The electronic device defined in claim 13 further comprising a cellular telephone transmitter that is coupled to the signal path.

15. The electronic device defined in claim 1 further comprising:

a housing containing conductive structures that form an antenna ground for the antenna and having a peripheral conductive member that runs around at least some edges of the housing, wherein at least part of the peripheral conductive member forms an antenna resonating element for the antenna.

16. An electronic device, comprising:

an antenna having a first antenna feed at a first location and a second antenna feed at a second location;

a first radio-frequency receiver that is configured to receive radio-frequency signals from the antenna in a first communications band;

a second radio-frequency receiver that is configured to receive radio-frequency signals from the antenna in a second communications band;

a first filter coupled between the first radio-frequency receiver and the first antenna feed, wherein the first filter is configured to pass the radio-frequency signals in the first communications band and is configured to exhibit a first impedance in the second communications band;

a second filter coupled between the second radio-frequency transceiver and the second antenna feed, wherein the second filter is configured to pass the radio-frequency signals in the second communications band and is configured to exhibit a second impedance in the first communications band, wherein the second filter and the antenna are configured so that the antenna exhibits a first resonance in the first communications band while the second filter is exhibiting the second impedance in the first communications band and wherein the first filter and the antenna are configured so that the antenna exhibits a second resonance in the second communications band while the first filter is exhibiting the first impedance in the second communications band; and a housing containing conductive structures that form an antenna ground for the antenna and having a peripheral conductive member that runs around at least some edges of the housing, wherein at least part of the peripheral conductive member forms an antenna resonating element for the antenna.

17. The electronic device defined in claim 16 wherein the first filter is configured to exhibit a third impedance in the first communications band and wherein the third impedance is less than the second impedance.

18. The electronic device defined in claim 16 further comprising a tunable circuit coupled to the second filter that is configured to tune the antenna.

19. The electronic device defined in claim 18 further comprising an adjustable capacitor in the tunable circuit.

20. The electronic device defined in claim 16, wherein the second filter comprises a notch filter.

21. An electronic device, comprising:

an antenna having first and second antenna feeds at different locations;

radio-frequency transceiver circuitry having a first circuit that handles communications associated with the first antenna feed and a second circuit that handles communications associated with the second antenna feed;

a first filter coupled between the first antenna feed and the first circuit, wherein the first filter is configured to pass radio-frequency signals in a first communications band and is configured to block radio-frequency signals in a second communications band;

a second filter coupled between the second antenna feed and the second circuit, wherein the second filter is configured to block the radio-frequency signals in the first communications band and is configured to pass the radio-frequency signals in the second communications band;

a tunable circuit coupled to the second filter that is configured to tune the antenna; and a tunable capacitor in the tunable circuit.

22. The electronic device defined in claim 21 further comprising a housing containing conductive structures that form an antenna ground for the antenna and having a peripheral conductive member that runs around at least some edges of the housing, wherein at least part of the peripheral conductive member forms an antenna resonating element for the antenna.

23. The electronic device defined in claim 22 further comprising a signal path between the second filter and the second circuit, the electronic device further comprising:

an additional antenna; and an antenna selection switch interposed in the signal path, wherein the antenna selection switch is coupled to the additional antenna.

24. The electronic device defined in claim 21, wherein the radio-frequency transceiver circuitry is configured to cover radio-frequency signals at low-band cellular telephone frequencies, at high-band cellular telephone frequencies, and at satellite navigation system frequencies that are less than the high-band cellular telephone frequencies and greater than the low-band cellular telephone frequencies.

25. The electronic device defined in claim 24, wherein the tunable capacitor comprises a switch-based adjustable capacitor that is configured to tune the antenna between first and second sub-bands of the low-band cellular telephone frequencies while the antenna covers the high-band cellular telephone frequencies.

26. The electronic device defined in claim 21, wherein the second filter comprises a notch filter.

* * * * *